United States Patent
Schaaf

(10) Patent No.: US 12,409,843 B2
(45) Date of Patent: Sep. 9, 2025

(54) OPTIMIZING RESOURCES NEEDED FOR ROAD MODEL DATA GENERATION WHILE ACHIEVING A DESIRED COVERAGE AMOUNT FOR A TEST SUITE

(71) Applicant: GM Cruise Holdings LLC, San Francisco, CA (US)

(72) Inventor: Russell Schaaf, Carlsbad, CA (US)

(73) Assignee: GM CRUISE HOLDINGS LLC, San Francisco, CA (US)

( * ) Notice: Subject to any disclaimer, the term of this patent is extended or adjusted under 35 U.S.C. 154(b) by 179 days.

(21) Appl. No.: 18/058,998

(22) Filed: Nov. 28, 2022

(65) Prior Publication Data

US 2024/0174242 A1    May 30, 2024

(51) Int. Cl.
*B60W 50/04* (2006.01)
*B60W 50/02* (2012.01)
*B60W 50/10* (2012.01)
*B60W 60/00* (2020.01)
*G01C 21/00* (2006.01)

(52) U.S. Cl.
CPC ........ *B60W 50/04* (2013.01); *B60W 50/0205* (2013.01); *B60W 50/10* (2013.01); *B60W 60/001* (2020.02); *G01C 21/3881* (2020.08); *B60W 2552/00* (2020.02)

(58) Field of Classification Search
CPC ............... B60W 50/04; B60W 60/001; B60W 50/0205; B60W 50/10; B60W 2552/00; G01C 21/3881
See application file for complete search history.

(56) References Cited

U.S. PATENT DOCUMENTS

2023/0195122 A1*   6/2023  Shenfeld ............ G01C 21/3841
                                                    701/26
2024/0126944 A1*   4/2024  Darling ............... G06F 11/3696

FOREIGN PATENT DOCUMENTS

WO    WO-2023062168 A1 *  4/2023  ............. G01C 21/32

* cited by examiner

*Primary Examiner* — Andrew J Cromer
(74) *Attorney, Agent, or Firm* — CANTOR COLBURN LLP

(57) ABSTRACT

Autonomous vehicles are tested and evaluated on the road and in simulated road environments. When testing and evaluating autonomous vehicles in a simulated road environment, having detailed three-dimensional geometries and characteristics of road surfaces in the form of road model data can greatly improve a simulated environment's ability to test and evaluate vehicle controls and dynamics, and can generate a more accurate pose for the autonomous vehicle in simulation. However, generating road model data is computationally expensive, and it is not desirable to generate road model data for an entire map to cover all test scenarios. An optimizer can reduce the amount of resources needed by selecting a least number of map sections to be generated and determining the locations of the map sections to be generated that achieves a desired coverage amount for the test suite.

20 Claims, 10 Drawing Sheets

OPTIMIZING RESOURCES NEEDED FOR ROAD MODEL DATA GENERATION WHILE ACHIEVING A DESIRED COVERAGE AMOUNT FOR A TEST SUITE

BACKGROUND

Technical Field

The present disclosure generally relates to autonomous vehicle testing and evaluation and, more specifically, to resource optimization when generating road model data for autonomous vehicle testing and evaluation.

Introduction

Autonomous vehicles, also known as self-driving cars, and driverless vehicles, may be vehicles that use multiple sensors to sense the environment and move without human input. Automation technology in autonomous vehicles may enable the vehicles to drive on roadways and to accurately and quickly perceive the vehicle's environment, including obstacles, signs, and traffic lights. Autonomous technology may utilize geographical information and semantic objects (such as parking spots, lane boundaries, intersections, crosswalks, stop signs, traffic lights) for facilitating the vehicles in making driving decisions. The vehicles can be used to pick-up passengers and drive the passengers to selected destinations. The vehicles can also be used to pick-up packages and/or other goods and deliver the packages and/or goods to selected destinations.

BRIEF DESCRIPTION OF THE DRAWINGS

The various advantages and features of the present technology will become apparent by reference to specific implementations illustrated in the appended drawings. A person of ordinary skill in the art will understand that these drawings show only some examples of the present technology and would not limit the scope of the present technology to these examples. Furthermore, the skilled artisan will appreciate the principles of the present technology as described and explained with additional specificity and detail through the use of the accompanying drawings in which.

DETAILED DESCRIPTION

Figure 1:
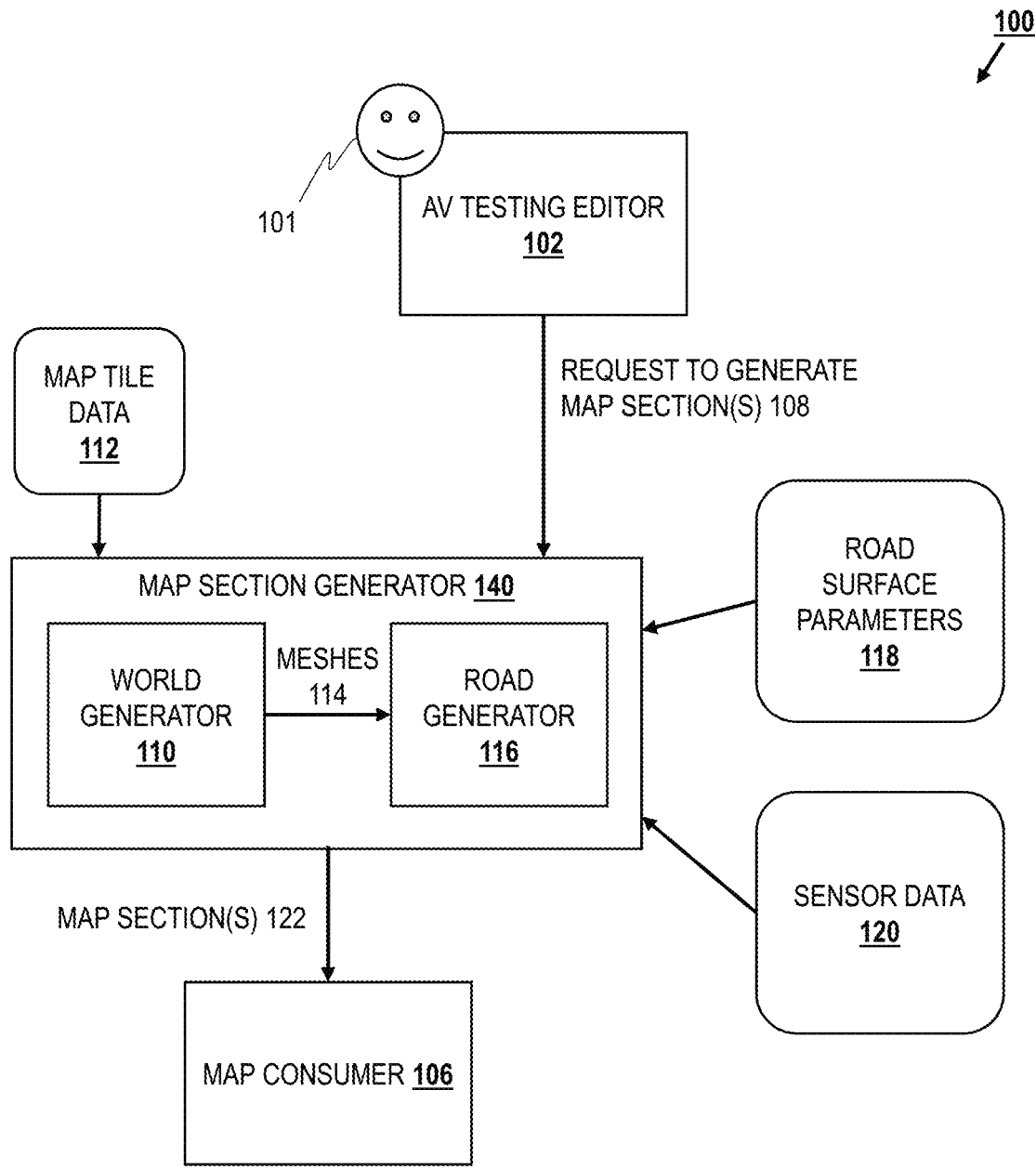
FIG. 1 is a system diagram illustrating components involved with composing a test suite and generating map sections for the test suite, according to some aspects of the disclosed technology.

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a more thorough understanding of the subject technology. However, it will be clear and apparent that the subject technology is not limited to the specific details set forth herein and may be practiced without these details. In some instances, structures and components are shown in block diagram form to avoid obscuring the concepts of the subject technology.

Overview

Autonomous vehicles (AVs) can provide many benefits. For instance, AVs may have the potential to transform urban living by offering opportunities for efficient, accessible, and affordable transportation. An AV may be equipped with various sensors to sense an environment surrounding the AV and collect information (e.g., sensor data) to assist the AV in making driving decisions. To that end, the collected information or sensor data may be processed and analyzed to determine a perception of the AV's surroundings, extract information related to navigation, and predict future motions of the AV and/or other traveling agents in the AV's vicinity. The predictions may be used to plan a path for the AV (e.g., from a starting position to a destination). As part of planning, the AV may access map information and localize itself based on location information (e.g., from location sensors) and the map information. Subsequently, instructions can be sent to a controller to control the AV (e.g., for steering, accelerating, decelerating, braking, etc.) according to the planned path.

The operations of perception, prediction, planning, and control of an AV may be implemented using a combination of hardware and software components. For instance, an AV stack or AV compute process performing the perception, prediction, planning, and control may be implemented using one or more of: software code, and firmware code. In some embodiments, the software code and firmware code may be supplemented with hardware logic structures to implement the AV stack and/or AV compute process. The AV stack or AV compute process (the software and/or firmware code) may be executed on processor(s) (e.g., general-purpose processors, central processing units (CPUs), graphical processing units (GPUs), digital signal processors (DSPs), application specific integrated circuits (ASICs), etc.) and/or any other hardware processing components on the AV. Additionally, the AV stack or AV compute process may communicate with various hardware components (e.g., onboard sensors and control systems of the AV) and/or with an AV infrastructure over a network.

Training and testing AVs in the physical world can be challenging. For instance, to provide good or sufficient testing coverage, an AV may be trained and tested to respond to various driving scenarios (e.g., millions of physical road test scenarios) before the AV can be deployed in an unattended, real-life roadway system. Such testing may require a large fleet of autonomous vehicles and thousands of hours of testing) As such, it may be costly and time-consuming to train and test AVs on physical roads. Further, there may be test cases that are difficult to create or too dangerous to cover in the physical world. Accordingly, it may be desirable to train and validate AVs in a simulator, which offers a virtual environment for AV evaluation.

A simulator may simulate (or mimic) and/or augment real-world conditions (e.g., roads, lanes, buildings, obstacles, other traffic participants (e.g., other vehicles, cyclists, and pedestrians), trees, lighting conditions, weather conditions, etc.) so that the AV stack and/or AV compute process of an AV may be tested in a virtual environment that is similar to a real physical world. The simulator may create a virtual environment that emulates physics of the real-world and sensors of an AV, and has virtual objects such as the AV itself, buildings, roads, non-player characters, traffic signs, etc. Testing and evaluating AVs in a simulator can be more efficient and allow for creation of specific traffic scenarios that may occur rarely in the real-world. Moreover, the AV compute process can even be tested in thousands of scenarios in parallel in simulation. More specifically, the AV compute process may be executed in a simulator simulating various traffic scenarios at a time. With simulators, the AV compute process implementing the perception, prediction, planning, and control algorithms can be developed, evaluated, validated, and fine-tuned in a simulation environment. Simulators can also be used to evaluate only a portion of the AV compute process.

In some cases, the simulator uses map data of a virtual environment to generate sensor data for a simulated AV (as if sensors of the simulated AV is reacting to a generated virtual environment), as the simulated AV traverses through a simulated traffic scenario (as if the simulated AV was traversing through a real-world traffic scenario). A virtual environment may be represented by, e.g., geometries and surface characteristics of surroundings such as buildings, objects, and non-player characters. In the context of virtual environments and simulations for AVs, non-player characters may be actors or agents. Examples of non-player characters can include road users such as pedestrians, other vehicles, bicycles, motorcycles, etc. The simulator can output a log of AV data (e.g., pose, speed, path, distance from non-player characters and/or objects, classifications, predictions, vehicle controls/driving decisions, output of the AV compute process, etc.). The AV data can later be analyzed to assess AV-related metrics (e.g., metrics related to AV driving decisions, and AV response time) to determine the performance of an AV to be deployed with the AV compute process.

In some instances, it may be desirable to capture a real-world driving scene (using sensors) and then convert and/or replay the captured scene in a simulation environment (e.g., a virtual driving environment) so that the performance (e.g., driving behaviors, response time, etc.) of an AV compute process can be analyzed, assessed, corrected, and/or improved. In an example, an AV may not perform well in a certain real-world driving scene, and thus it may be desirable to analyze (or debug) and/or improve the AV compute process (or different versions thereof) offline in a simulation environment.

In some examples, an AV compute process may be updated (e.g., a new AV software version), and thus it may be desirable to evaluate the performance of the updated AV compute process (e.g., in a variety of driving scenarios) prior to deploying the updated AV compute process in a vehicle operating in the real-world. Accordingly, AV simulation can benefit from debugging of AV driving performance and various stages of AV code development and release integration. A simulator can offer different scenarios in which the AV compute process can be evaluated.

In some cases, the simulator augments the real-world driving scenarios to create many different scenarios (e.g., what-if scenarios) based on a real-world driving scenario, and allows the AV compute process to be run in the simulator to test and evaluate AV-related metrics across many different scenarios. A variety of aspects of a captured real-world driving scenario can be adjusted to generate the what-if scenarios, such as weather/atmospheric conditions, lighting conditions, number of non-player characters (NPCs) (i.e., all moving objects in a scenario that are not the AV being tested), parameters of NPCs, locale, geography, traffic signs, types of objects, etc.

In some cases, the simulator generates fictitious driving scenarios to create a test suite so that a certain objective for testing the AV compute process can be achieved. The scenarios may be generated based on a description of the driving scenarios, specifying, e.g., a locale, time of day, and density of NPCs. The scenarios may take place in virtual environments that are created from artist specifications (e.g., provided via a three-dimensional (3D) computer graphics engine or tool). The AV compute process can be run in the simulator to test and evaluate AV-related metrics in defined scenarios of the test suite. A variety of aspects of a fictitious scenario can be adjusted, such as weather/atmospheric conditions, lighting conditions, number of NPCs, parameters of NPCs, locale, geography, traffic signs, types of objects, etc.

AVs are tested and evaluated on the road and in simulated road environments. When testing and evaluating AVs in a simulated road environment, having detailed three-dimensional geometries and characteristics of road surfaces in the form of road model data can greatly improve a simulated environment's ability to test and evaluate vehicle controls and dynamics, and can generate a more accurate pose for the autonomous vehicle in simulation. However, generating road model data is computationally expensive, and it is not desirable to generate road model data for an entire map to cover all test scenarios. An optimizer can reduce the amount of resources needed by selecting a least number of map sections to be generated and determining the locations of the map sections to be generated that achieves a desired value of a coverage amount for the test suite.

Exemplary System for Creating Map Sections Usable for Simulations

FIG. 1 is a system diagram illustrating components involved with composing a test suite and generating map sections for the test suite, according to some aspects of the disclosed technology. The system 100 includes AV testing editor 102, map section generator 140, and map consumer 106.

A user 101 can define a test suite having scenarios within a geographical region and provide the definition to AV testing editor 102. For instance, a test suite can be defined to test a certain AV-related metric. One exemplary test suite can be defined to have thousands of scenarios at different 4-way stop intersections on a map to evaluate whether an AV can accurately determine a right of way order at the 4-way stop. Another exemplary test suite can be defined to have thousands of scenarios involving the AV taking different left turns to evaluate a comfort level of a particular version of an AV compute process. Another exemplary test suite can be defined to have thousands of scenarios involving a bike lane in the road to evaluate whether an AV will be able to detect bicyclists and keep a sufficient distance from the bicyclists.

To execute or run the scenarios of the test suite in a simulator, chunks of map data covering an entire geographical region (or portions of a geographical region), may be generated on-demand based on source map data, source sensor data, and other potential data sources. The map data may then be provided to a map consumer 106, such a specific type of simulator. There may be other map consumers other than a simulator. One type of simulator can be a simulator that generates a virtual environment that mimics the real-world. Another type of simulator can generate a virtual environment and a simulation of the AV controls within the virtual environment. Another type of simulator can generate a virtual environment and a simulation of (at least a portion of) the AV compute process (e.g., a planning sub-process) within the virtual environment. Another type of simulator can generate a virtual environment with non-player characters whose behavior in the virtual environment is generated using artificial intelligence. Another type of simulator can generate a virtual environment that replays a real-world scenario based on sensor data collected by an AV in the real-world.

A chunk of map data can include different data types, including 3D simulation content packages, road (surface) model packages, and AV map tile data. Chunks of map data are also referred herein as "map sections". A map section can include map data within a bounding box defined by the map section (e.g., a bounding box of a map section can be specified by x, y coordinates, and height, width dimensions). Map section may be used herein interchangeably with a section of a map, e.g., a bounding box or rectangular area of a geographical region. Generating a map section may mean generating the map data (e.g., world model data, and road model data) that corresponds to the area within the bounding box of a map section. The data type(s) included in a chunk of map data can differ depending on the requirements of the map consumer 106.

Generating chunks of map data is resource intensive. Generating a chunk of map data for a small 1 km² area on a map can take hours, and compute cluster costs can quickly add up when many chunks of map data are being generated for a given geographical region. In some test scenarios, the underlying source data (e.g., source map data, source sensor data, etc.) from which the chunks of map data are generated may change (e.g., due to road construction, other changes in the underlying data, expiration/invalidation of the underlying data, or changes to the sensors that are collecting the underlying data). Such changes to the underlying data would mean that new chunks of map data would need to be generated when a new test suite is defined (and not allowing previously generated chunks of map data to be reused). Also, as new geographical regions are being added, new chunks of map data would need to be generated for test suites. Some test suites may demand chunks of map data that contain additional data types (e.g. road surface model data) or higher fidelity data, which also increases the resources needed to generate the chunks of map data. For example, a kinematic comfort level test suite may depend on availability and/or fidelity of road model data in the chunks of map data to accurately simulate vehicle controls and vehicle dynamics.

AV testing editor 102 may include a graphical user interface (GUI) and/or a command line interface (CLI). The AV testing editor 102 can receive input from user 101. The user input from user 101 may include a definition of a test suite. A test suite can include a plurality of scenarios. For instance, the user 101 may provide a description that specifies a filter, based on a set of condition(s) or requirement(s), for the desired scenarios to be included in a test suite. For instance, the user may provide a definition of a filter that can include one or more sets of defining characteristic(s) for the scenarios of the test suite. The filter may be applied to a pool of available scenarios to select certain scenarios for the test suite. In another instance, the user 101 may provide a description of scenarios for an AV test suite. In another instance, the user 101 may select or identify a set of scenarios out of different sets of scenarios to use for a test suite. In another instance, the user 101 may input goal(s) of the test suite (e.g., hand braking, acceleration, deceleration, comfort, safety, etc.), and an algorithm may process possible scenarios in a map to determine which scenarios are to be included in the test suite to achieve the goal(s).

A request 108 to generate a map section (e.g., map data within an area of the map section) for the entire geographical region can be transmitted from the AV testing editor 102 to map section generator 140. The request 108 can specify a bounding box of the entire geographical region, where the bounding box corresponds to the map section to be generated. Generating map section(s) (e.g., the map data within the map section) is a resource intensive process, and can take hours to days to generate the map section(s) for the entire geographical region. Map section generator 140 can generate 3D geometry information and surface parameters/characteristics of the virtual environment, and can output the information as map section(s). The map section(s) 122 can be provided to a map consumer 106, such as a simulator.

In some cases, map section generator 140 includes world generator 110 and (optionally) road generator 116. The role of the map section generator 140 is to generate data sets representing 3D geometry and surface parameters/characteristics of a virtual environment, such that a simulated AV can be placed in the virtual environment and respond to the virtual environment as if the AV was in the real-world. The data set preferably includes information that can impact AV sensor data (e.g., camera data, radio detection and ranging (RADAR) data, light detection and ranging (LIDAR) data, and any other perception-related AV sensor) or serves as a simulated stimulus to AV sensors. For instance, the data set may include 3D geometry information (e.g., surface information, geo-coordinates, surface normals, etc.). The data set preferably also includes surface parameters/characteristics (e.g., as textures, material type, colors, reflectivity, coarseness, coefficient of friction, fidelity, scattering index, opacity, etc.) for the surfaces in the data set. In some cases, the data set is generated based on source data, such as sensor data 120 that is collected from the real-world. For instance, LIDAR and RADAR sensor data can be transformed into 3D geometry information, and camera data can be used to provide surface parameters/characteristics.

World generator 110 can receive map tile data 112 (including, e.g., semantic map of the geographical region, and information relating to object(s)/structure(s) in the geographical region) to form 3D geometry information (sometimes referred to as world model data) that correspond to a virtual environment. World model data can include meshes 114 and optionally surface parameters/characteristics of objects in the virtual environment, such as buildings, traffic lights, and signs. In some cases, world generator 110 may use sensor data 120 (or other source data or libraries) to generate meshes 114 and extract surface parameters/characteristics. Meshes 114 can include triangular meshes representing surfaces of the virtual environment. Meshes 114 can include interconnected points, edges, and faces.

Optionally, map section generator 140 includes road generator 116. Road generator 116 can generate road model data that includes 3D geometry information of road surfaces, and surface parameters/characteristics. In some cases, road generator 116 takes meshes 114 that correspond to roads and sidewalks generated by world generator 110, and adds road surface parameters 118 to form road model data. A road model data may provide (discontinuous or continuous) height/elevation data, and (discontinuous or continuous) surface normals. The road model data may provide location-dependent surface parameters/characteristics such as color, texture, coefficient of friction, roughness, reflectivity, material type, visual image, etc. Road model data generated by road generator 116 may have correspondence with or match sensor data 120 collected in the real-world. Such correspondence can improve accuracy and increase fidelity for simulations for vehicle dynamics and comfort. Additionally, the correspondence with sensor data 120 can improve accuracy of the pose of the simulated AV. Also, the road model data generated by road generator 116 may assist placement of non-player characters in some simulations. Moreover, road model data may enable simulation of road noise, which can depend on how tires interact with the road surface.

In some cases, road generator 116 may generate road model data that include permanent or semi-permanent road features such as rail lines, manhole covers, potholes, speed bumps, ice patches, puddles, snow piles, sand, debris, etc. In some cases, road generator 116 may further include road model data that capture overpass surfaces and tunnel surfaces.

In some cases, the road model data may provide, for x, y position within an area, one or more of: (continuous or discontinuous) height, (continuous or discontinuous) normal, and location-specific road surface parameter(s). For instance, location-specific road parameter(s) can include one or more of: material type, roughness, and friction coefficient.

In some cases, road generator 116 may be a part of world generator 110.

World generator 110 and (optionally) road generator 116 together generate map section(s) 122 (e.g., map data of the map section(s) 122), which can be provided to map consumer 106.

Exemplary Outputs from World Generator and Road Generator

Figure 2:
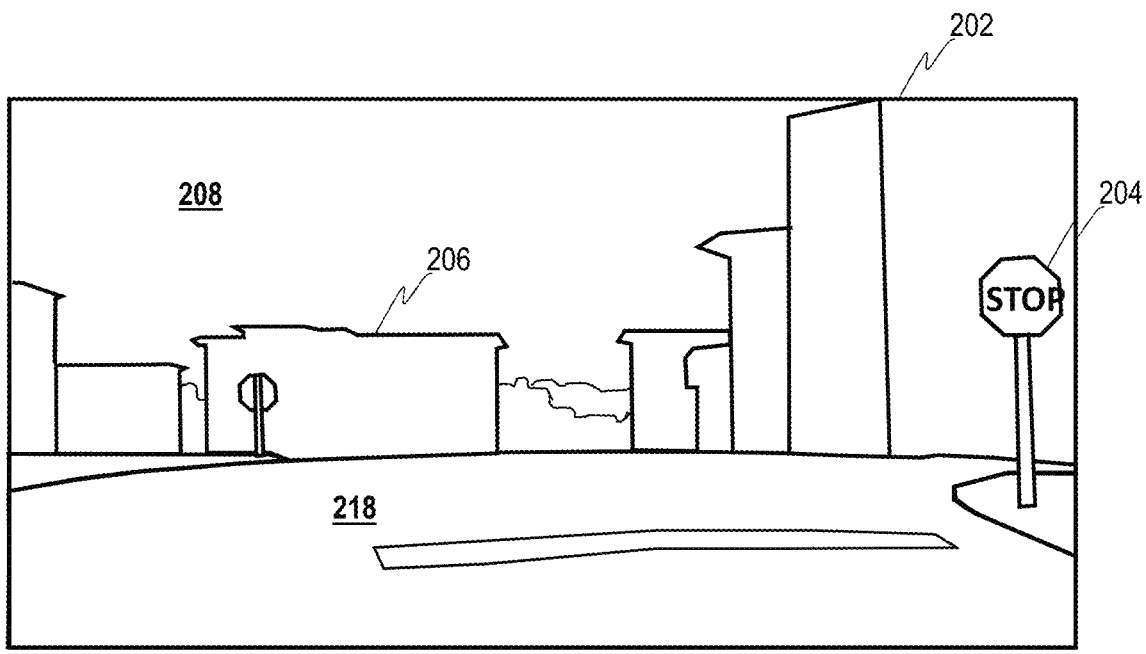
FIG. 2 illustrates a visualization of output from a world generator, according to some aspects of the disclosed technology.

FIG. 2 illustrates a visualization 202 of output from a world generator, e.g., world generator 110 of FIG. 1, according to some aspects of the disclosed technology. Visualization 202 illustrates what a simulator can render as a camera image based on the map data generated by world generator 110 of FIG. 1. A simulated AV is approaching an intersection 218 with a stop sign 204 in a virtual environment. The virtual environment includes structures (such as building 206). Additionally, the virtual environment can include a sky 208.

Figure 3:
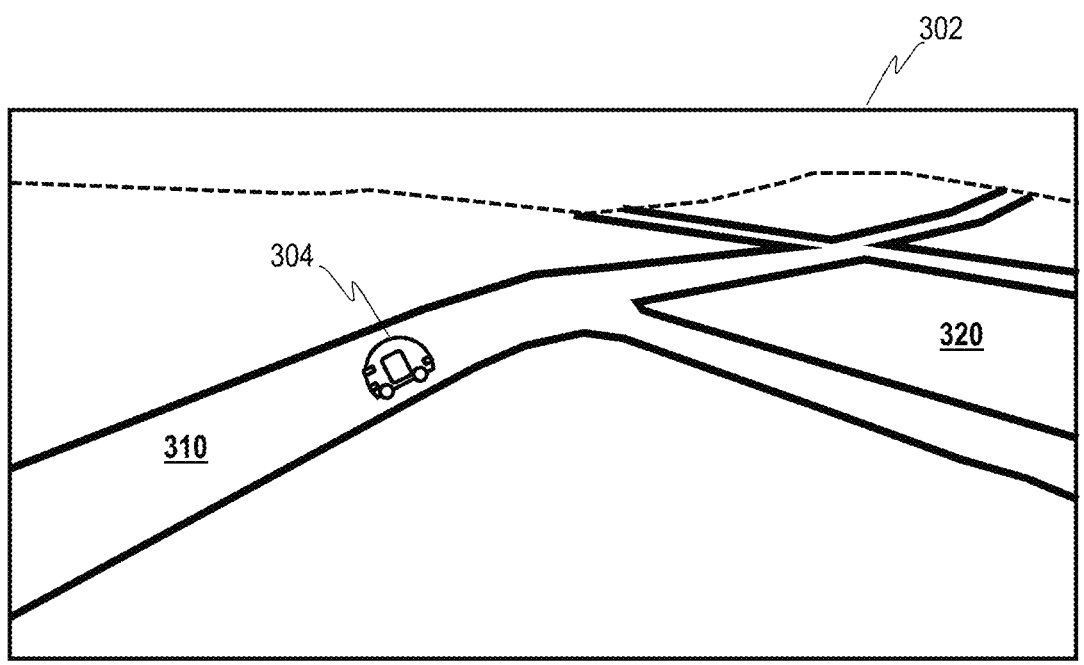
FIG. 3 illustrates a visualization of output from a road generator, according to some aspects of the disclosed technology.

FIG. 3 illustrates a visualization 302 of output from a road generator, e.g., road generator 116, according to some aspects of the disclosed technology. Visualization 302 has a simulated AV 304 (whose front camera view of the virtual environment is shown as visualization 202 of FIG. 2). Visualization 302 shows the topology and 3D geometries of the virtual environment including the road surface 310 and non-road surface 320. Road surface models can be particularly advantageous for vehicle dynamics simulation and kinematics comfort evaluation, especially if the roads are hilly.

Figure 4:
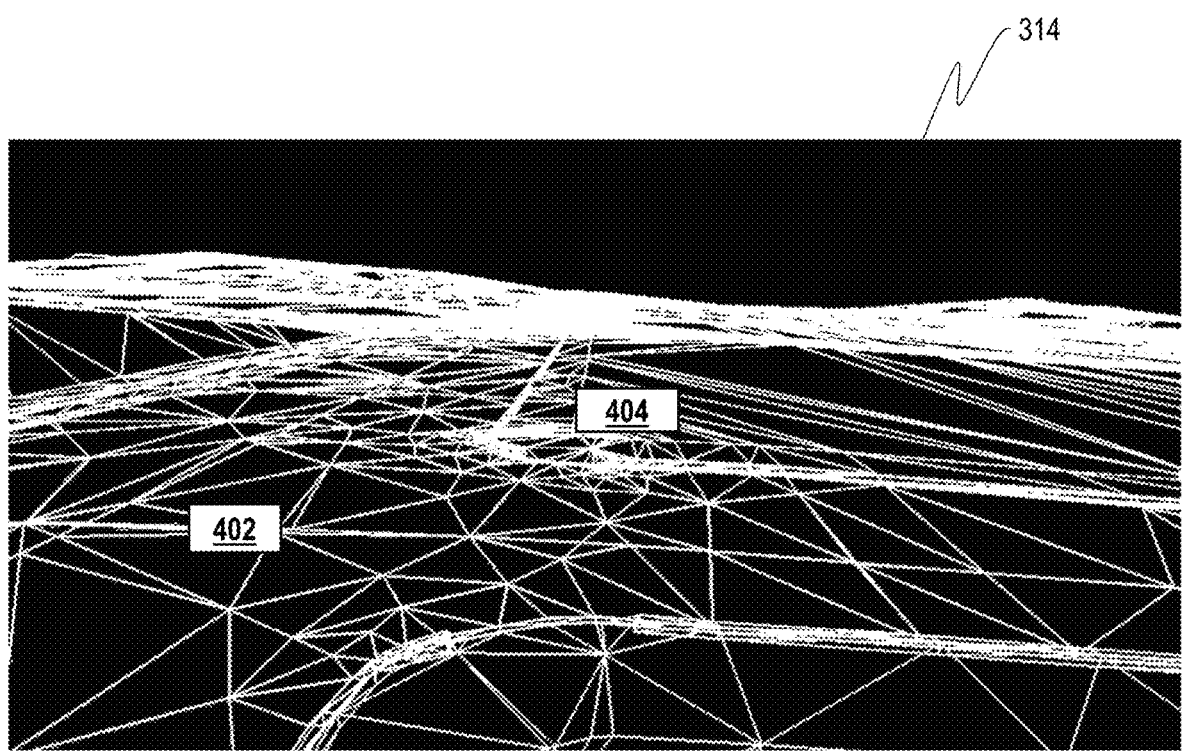
FIG. 4 illustrates triangular mesh representation of road and sidewalks, according to some aspects of the disclosed technology.

FIG. 4 illustrates triangular mesh representation 314 of roads and sidewalks, according to some aspects of the disclosed technology. As discussed with FIG. 1, world generator 110 can produce meshes 114 for a road generator. The triangular mesh representation 314 has interconnected points, edges (shown as white lines in the figure), and faces, to represent roads and sidewalks. Triangular mesh representation of road 402 and sidewalk 404 is shown in FIG. 4. Other types of surface representations are envisioned by the disclosure, such as other polygonal meshes, parametric surfaces, implicit surfaces, etc.

The triangular mesh representation 314 of the road surface of a given map section can be generated based on source data such as sensor data, and semantic map tile data. A triangular mesh representation 314 can be generated by triangulating semantic map road outlines (e.g., from map tile data 112 in FIG. 1) with additional height information provided by smoothed LIDAR height tiles (e.g., from sensor data 120 in FIG. 1). Meshes for sidewalks can be generated in a similar fashion. The result is a 3D model of the ground, which can provide geometry information of the road. Furthermore, (location-dependent) road surface parameter(s) corresponding to the road surface can be retrieved (e.g., from road surface parameters 118 of FIG. 1). The road model data can then be generated by combining the triangular mesh representation and retrieved location-specific road surface parameter(s).

Reduce Resource Usage by Optimizing for a Desired Value of a Coverage Amount

Referring back to FIG. 1, map data for an entire geographical region may be generated to support a test suite. This process may take hours to days. In particular, generating road surface models for the map sections can be very resource intensive. To address this concern, different techniques can be applied to optimize generation of map data within map sections to meet a certain coverage amount or requirement without over generating map data for areas of a map or map sections that are not necessary to meet the coverage requirement.

Figure 5:
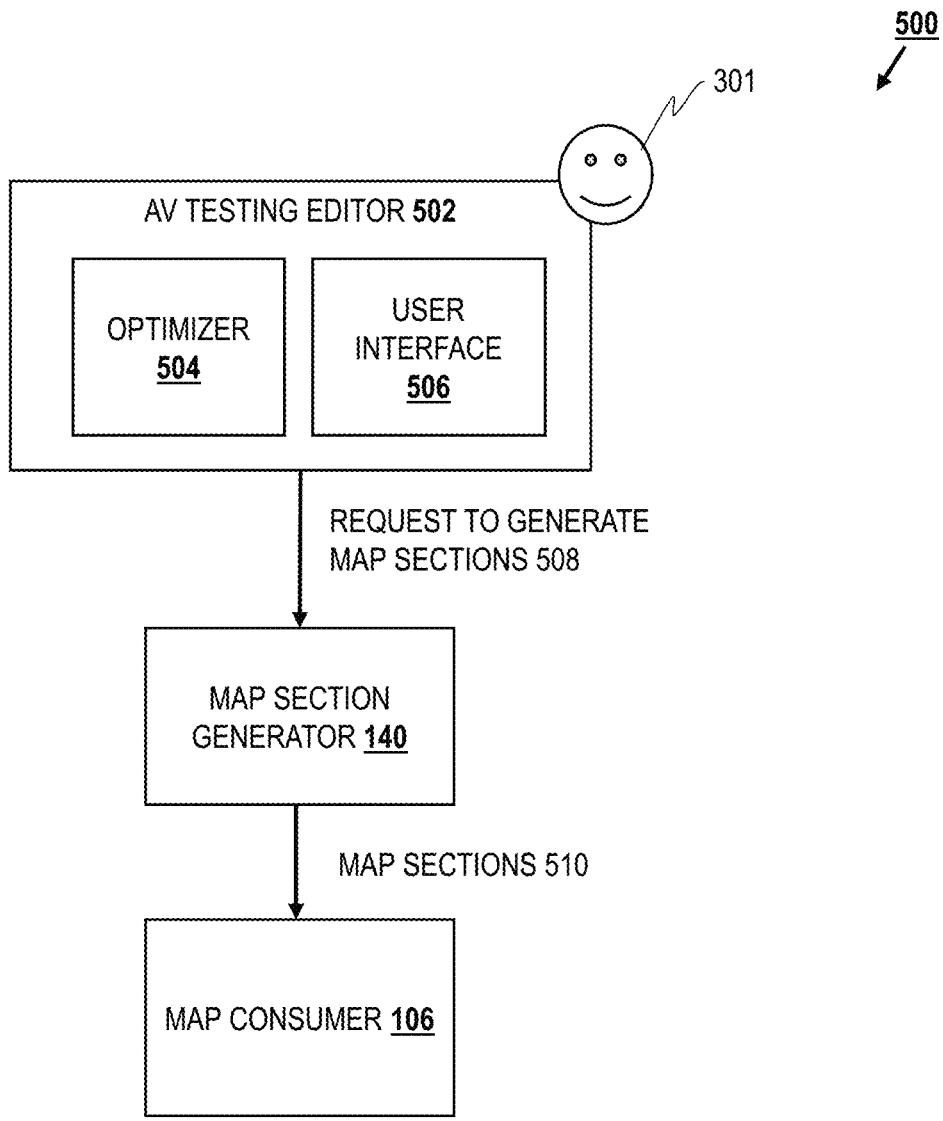
FIG. 5 is a system diagram illustrating an optimizer to reduce resource usage when generating map sections and a user interface to receive a desired value of a coverage amount for a given test suite, according to some aspects of the disclosed technology.

FIG. 5 is a system diagram illustrating an optimizer 504 to reduce resource usage when generating map sections (e.g., map data within the map sections), and a user interface 506 to receive a desired coverage amount (or desired value of a coverage amount) for a given test suite, according to some aspects of the disclosed technology. Similar to FIG. 1, system 500 includes AV testing editor 502, map section generator 140, and map consumer 106. The optimizer 504 and the user interface 506 may be provided in AV testing editor 502, which can improve upon the functionalities of AV testing editor 102.

The user interface 506 may include a GUI and/or a CLI. The AV testing editor 502 can receive input from user 301 via user interface 506. The user input from user 301 may include a definition of a test suite. A test suite can include a plurality of scenarios. For instance, the user 301 may provide a description that specifies a filter having a set of defining characteristics for the scenarios of the test suite. The filter may be applied to a pool of available scenarios to select certain scenarios for the test suite. In another instance, the user 301 may provide a description of scenarios for an AV test suite. In another instance, the user 301 may select or identify a set of scenarios out of different sets of scenarios to use for a test suite. In another instance, the user 301 may input goal(s) of the test suite (e.g., hard braking, acceleration, deceleration, comfort, safety, etc.), and an algorithm may process possible scenarios in a map to determine which scenarios are to be included in the test suite to achieve the goal(s).

Further to receiving user input that would yield a test suite having scenarios, the user interface 506 may receive a desired coverage amount for the test suite from user 301. This desired coverage amount may be a percentage (e.g., 80%, 90%, 95%, or 100%). In some cases, the desired coverage amount may differ depending on characteristics of the scenarios (e.g., 95% for scenarios on roads that have a surface coefficient that is lower than some value). The desired coverage amount may depend on the goal(s) or nature of the test suite.

Coverage amount of a test suite can be defined based on a proportion of bounding boxes or areas corresponding to the scenarios of the test suite with pre-existing or valid map data (e.g., road model data) relative to a total area of all bounding boxes or areas. In some cases, coverage amount of a test suite can be defined based on a proportion of scenarios of the test suite with pre-existing or valid map data (e.g., road model data) relative to a total number of all scenarios in the test suite.

Optimizer 504 can perform several steps to optimize resources being used to generate map data or map sections (e.g., map data within the map sections) for a given test suite and desired coverage amount. The process implemented by optimizer 504 may involve one or more of the following:

The optimizer 504 may translate individual scenarios into corresponding bounding boxes or areas on a map;

The optimizer 504 may determine whether a given bounding box already has underlying (pre-existing or valid) map data, in particular, road model data;

The optimizer 504 may calculate a present coverage amount;

The optimizer 504, can determine or identify a least number of map sections, and the location of those sections (e.g., bounding box definitions of the sections), to be generated that yields a target coverage amount (a target value of coverage amount) of the test suite, where the target coverage amount is equal to or exceeds the desired coverage amount; and The optimizer 504 can transmit a request or job to generate the map sections (e.g., map data within the map sections).

Figure 6:
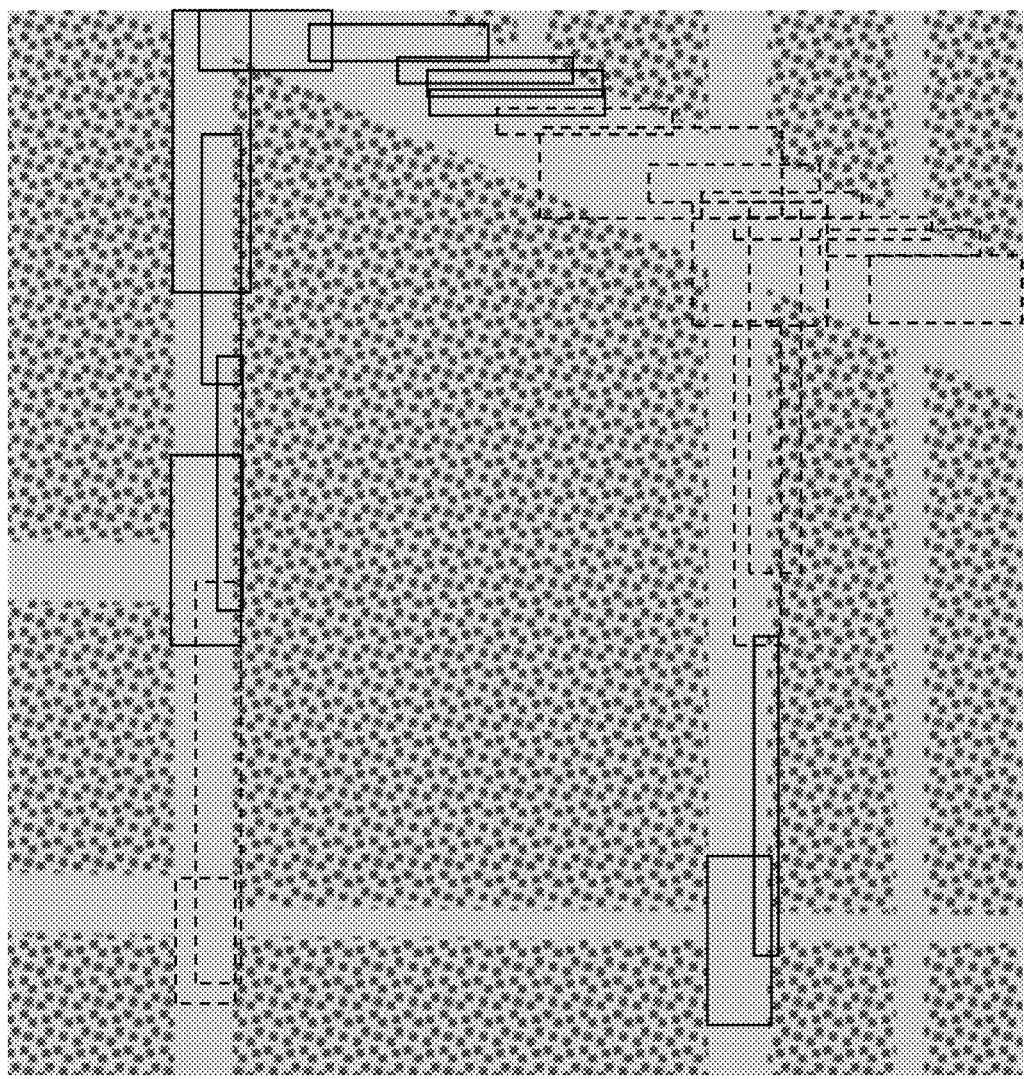
FIG. 6 illustrates exemplary areas or bounding boxes corresponding to a test suite, according to some aspects of the disclosed technology.

The scenarios in a test suite may have corresponding paths that a simulated AV would traverse in the scenarios. A path is defined to be a line on a map that a simulated AV is expected to traverse for a scenario. Bounding boxes or areas on a map can be determined, e.g., using a script in optimizer 504 in AV testing editor 502, based on the paths that the simulated AV would traverse in the scenario. An example of bounding boxes or areas on the map is illustrated in FIG. 6. To determine the bounding boxes or areas corresponding to the scenarios of a test suite, the optimizer 504 may determine areas (surrounding the paths) on the map expected to be traversed by a simulated AV in the scenarios of the test suite.

In some cases, the bounding boxes are specified in a data object file (e.g., a JavaScript Object Notation (JSON) file). The bounding boxes in the data object file represents geographical information that corresponds to the scenarios, i.e., geographical data extracted from each scenario of the test suite.

Accordingly, a test suite having scenarios may be translated into bounding boxes or areas on the map that correspond to the scenarios. These bounding boxes or areas can be a measure or indicator for where map data, in particular road model data, would be needed to support the test suite.

A script in optimizer 504 in AV testing editor 502 can determine which ones of the bounding boxes or areas (corresponding to scenarios of the test suite) may have pre-existing or valid map data, such as pre-existing or valid road model data specific to the bounding boxes or areas. FIG. 6 illustrates some bounding boxes with pre-existing or valid map data, in particular road model data, specific to the bounding boxes, and some bounding boxes without pre-existing or valid map data, in particular road model data, specific to the bounding boxes. In some cases, the bounding boxes with pre-existing or valid map data may be accentuated in the user interface 506. Alternatively or additionally, the bounding boxes without pre-existing or valid map data may be accentuated in the user interface 506.

The optimizer 504 may determine a present coverage amount of the test suite based on a total area of the bounding boxes with pre-existing or valid map data (e.g., road model data) relative to a total area of all of the bounding boxes corresponding to the scenarios of the test suite. The optimizer 504 may also determine a present coverage amount of the test suite by determining the percentage of scenarios in the suite for which the scenario bounding box is contained within an existing map section. This present coverage amount may be output to a user 301 via user interface 506, to inform the user 301. User 301 may be able to view a visualization that resembles the image shown in FIG. 6.

Optimizer 504 can use a script in optimizer 504 in AV testing editor 502 to determine or propose additional map sections within which map data is to be generated that can increase the present coverage amount to meet the desired coverage amount. The least number of map sections within which map data is to be generated to achieve the desired coverage amount may be output to user 301 via user interface 506. Optionally, the locations of the map sections within which map data is to be generated (or a visualization of the map sections and their locations represented on a map view) to achieve the desired coverage amount can also be output to the user 301 via user interface 506. In some cases, a least number of map sections (e.g., a count) within which map data is to be generated that can increase the present coverage amount to achieve the desired coverage amount may be output to user 301 via user interface 506. Optionally, the locations of the map sections within which map data is to be generated to increase the present coverage amount to achieve the desired coverage amount also be output to the user 301 via user interface 506.

The script in optimizer 504 may perform an optimization algorithm to identify a minimum or least number of map sections within which map data is to be generated, and locations of the map sections within which map data is to be generated that would yield a target coverage of the test suite, where the target coverage amount is equal to or exceeds the desired coverage amount. In some cases, optimizer 504 may identify a set of map sections within which map data is to be generated that not only has a least number of map sections, but the map sections has locations which can maximize the coverage amount.

The target coverage amount of the test suite can be defined based on a proportion of a total area of bounding boxes or areas of the test suite having (pre-existing or valid) map data (such as road model data) and bounding boxes or areas included in the map sections within which map data is to be generated, relative to a total area of bounding boxes or areas.

The target coverage amount can be defined by the AV testing editor 502 to be the proportion of scenarios in a test suite whose bounding boxes are completely contained in the map sections having (pre-existing or valid) map data or contained in the map sections within which map data is to be generated, relative to a total number of scenarios in the test suite.

The optimization algorithm may be implemented in different ways in optimizer 504. The optimization algorithm can be defined by an objective function that is based on one or more of the following variables: the number of candidate map sections (the number of map sections in a given candidate set of map sections) within which map data can be to be generated, the locations of candidate map sections, sizes of candidate map sections (if size is variable and not fixed), and the scenario bounding boxes (optionally excluding scenarios which were covered by pre-existing or previously generated or valid map sections).

In some examples, the objective function can receive two lists as input: (1) a list having locations and optionally sizes of candidate map sections, and (2) a list having scenario bounding boxes (if applicable, excluding scenario bounding boxes which were not already covered by pre-existing or previously generated or valid map sections).

The objective function can measure the number of scenarios that are not covered by a given set of candidate map sections. The number of scenarios (or areas/bounding boxes that correspond to the scenarios) that are not yet covered by the candidate map sections can be minimized by the optimization algorithm. The candidate map sections being considered in the objective function can have a target coverage amount (calculated based on a set of candidate map sections to be generated) that meets or exceeds the desired coverage amount. The optimization algorithm can find a solution that includes a least number of candidate map sections, locations for the candidate map sections, and optionally sizes for those candidate map sections, that can yield a target coverage amount that meets or exceeds the desired coverage amount.

A search algorithm is implemented in optimizer 504 to identify different possible sets of candidate map sections (or different candidate sets of map sections) within which map data can be generated (without having to perform an exhaustive search on the map). To identify different possible sets of candidate map sections, the search algorithm searches over the map for sets of candidate map sections. One heuristic or starting point that can be used may include identifying centroids or areas where bounding boxes or areas lacking map data or road model data may be densest on the map. Sets of candidate map sections can be generated near or at the centroids or areas. Examples of search algorithms include one or more of the following: greedy search algorithm, genetic/evolutionary search algorithm, stochastic search algorithm, hill-climbing, and simulated annealing algorithms.

In some cases, search algorithms may expect a continuous function as an objective function, so that different sets of candidate map sections being evaluated by the optimization algorithm can move up and down the objective function to find the optimum value of the objective function. Since the objective function may measure the number of scenarios which are not covered by the candidate map sections, the objective function is discrete (i.e., not continuous). To make the objective function continuous, the objective function may additionally measure how close (i.e., distance-wise) covered scenarios are to the center of the candidate map sections (in addition to the number of scenarios not covered by the candidate map sections or pre-existing or valid map data). This objective function may prefer placing candidate map sections such that the scenarios are in the center, rather than on the edges of the candidate map sections.

The optimization algorithm may evaluate (many) candidate sets of map sections (e.g., candidate sets may be produced by the search algorithm) to select one candidate set. For each candidate set, the objective function is used to evaluate or calculate a (cost) value. The value may be minimized by the optimization algorithm to determine or select an optimal set of map sections from the candidate sets of map sections. The candidate sets of map sections may cover at least a portion of the first areas on the map that lack road model data. The candidate sets of map sections may meet the desired value of the coverage amount of the test suite when road model data of a given candidate set of map sections are generated. In some embodiments, the optimization algorithm generates the candidate sets of map sections, and the optimization algorithm selects a set of map sections from the candidate sets of map sections that has a least number of map sections and that minimizes a number of road scenarios that are not covered by the candidate sets of map sections (e.g., the objective function).

The optimization algorithm may be parameterizable to yield different optimized sets of map sections to be generated. User 301 may input parameters via user interface 506 of AV testing editor 502. Parameters of the optimization algorithm may include one or more of the following:
- dimensions of the map sections (e.g., 1 km×1 km map sections),
- indication that dimensions of the map sections can be variable, and constraints on the dimensions (minimums and maximums)
- indication the map sections can or cannot overlap each other, and
- a padding value specifying a distance between a border of an area and an edge of road model data, where the padding value can be used for determining whether the area has pre-existing or valid road model data or for determining whether the area is captured or covered by a candidate map section.

Figure 7:
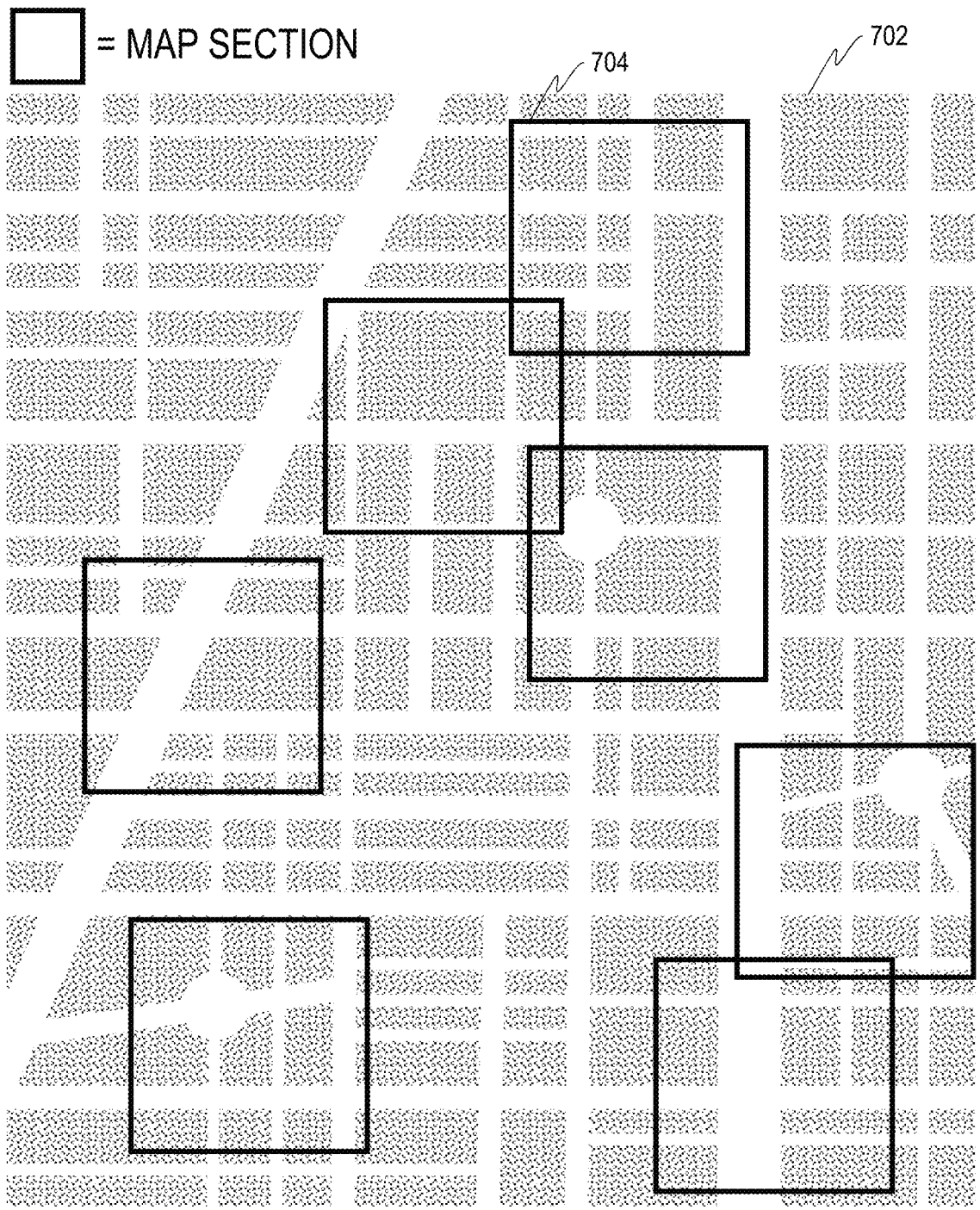
FIG. 7 illustrates exemplary map sections to be generated to meet a desired value of a coverage amount, according to some aspects of the disclosed technology.

Exemplary optimization results are shown in FIG. 7, which illustrates exemplary map sections within which map data is to be generated to meet a desired coverage amount, according to some aspects of the disclosed technology. In map 702, several map sections such as map section 704 can be determined by optimizer 504 in FIG. 5. In this example, the map sections within which map data is to be generated are allowed to overlap each other, and have a fixed size (e.g., 1 km×1 km).

Figure 8:
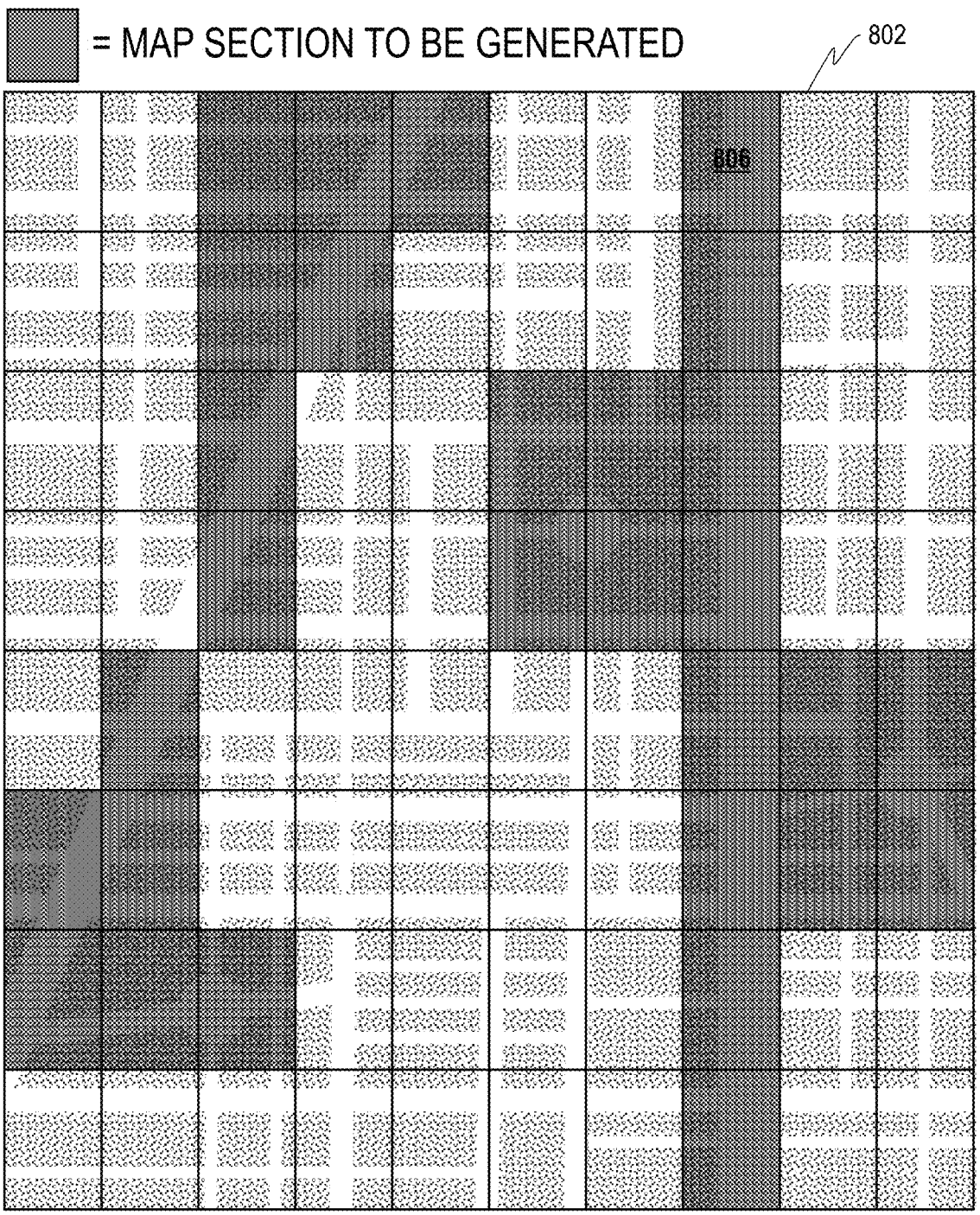
FIG. 8 illustrates exemplary map sections to be generated to meet a desired value of a coverage amount, according to some aspects of the disclosed technology.

In some cases, the optimization and search algorithms are performed on a grid of non-overlapping bounding boxes that divides the map. Finding the least number of bounding boxes may include identifying a least number of non-overlapping bounding boxes as map sections that achieve the desired coverage amount of the test suite. In this implementation, multiple map sections may be required to cover a specific scenario, if that specific scenario's bounding box is on or near a grid cell boundary. Exemplary optimization results are shown in FIG. 8, which illustrates exemplary map sections within which map data is to be generated to meet a desired coverage amount, according to some aspects of the disclosed technology. In map 802 with a grid of non-overlapping bounding boxes, several map sections such as map section 806 may be selected by optimizer 504 of FIG. 5.

In some cases, it is equivalent for the optimizer 504 in FIG. 5 to determine map sections within which map data is to be generated that require a least amount of computing resources. The objective function may be defined based on an amount of required computing resources for a set of candidate map sections.

In some cases, it is equivalent for the optimizer 504 in FIG. 5 to determine map sections within which map data is to be generated that require a least amount of area. The objective function may be defined based on a total area covered by a set of candidate map sections.

In some cases, the desired coverage amount includes a percentage of areas on the map (e.g., scenario bounding boxes or scenarios of the test suite) meeting one or more conditions or requirements. For example, a desired coverage amount can be 85% of scenarios having road grade>5%.

In some cases, the desired coverage amount may include multiple percentages of areas on the map meeting different conditions/requirements. For example, a desired coverage amount can include: 85% of scenarios having road grade>5%, and 95% of scenarios having road grade>10%.

If the desired coverage amount is applicable to a subset of areas (e.g., scenario bounding boxes or scenarios of the test suite), the optimization algorithm may apply a filter to areas which are not yet covered by pre-existing or valid map data when minimizing the objective function.

Such ways of defining the desired coverage amount can allow the optimization algorithm to target or prioritize resources for generating map sections for scenarios that may benefit from the data in the map sections the most.

Referring back to FIG. 5, once the map sections within which map data is to be generated are identified by optimizer 504, the optimizer 504 can transmit a request 508 or a job to generate map data within the map sections. The request 508 or job may be transmitted to map section generator 140. The generated map sections 510 can include map data, e.g., location-specific road model data usable for autonomous vehicle evaluation (such as in a simulator or another map consumer 106 of FIG. 5).

Map sections within which map data is to be generated may be defined by an identifier, (optionally) a bounding box (e.g., x, y coordinates, and width and height dimensions), (optionally) a source data set identifier (e.g., identifier of source sensor data and/or identifier of source map data to use for map data generation), and (optionally) a timestamp (e.g., to determine what source sensor data and/or source map data to use for map data generation). Source data set identifier and timestamp may enable map section generator 140 to identify source sensor data and/or source map data for map data generation.

Method for Optimizing Computing Resources Used in Generating Map Sections

Figure 9:
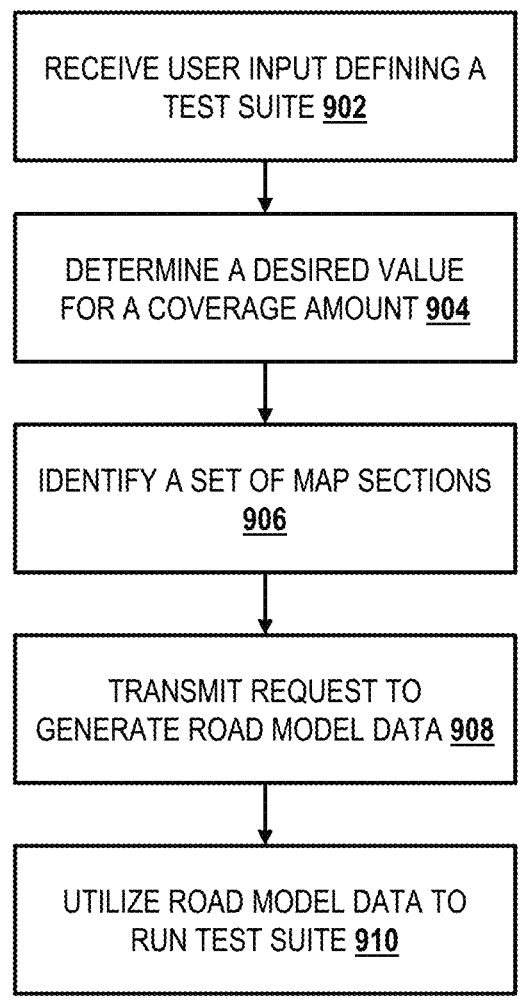
FIG. 9 is a flow diagram illustrating a method for optimizing computing resources used in generating map sections for autonomous vehicle evaluation, according to some aspects of the disclosed technology.

FIG. 9 is a flow diagram illustrating a method for optimizing computing resources used in generating map sections for autonomous vehicle evaluation, according to some aspects of the disclosed technology. The method may be implemented by the systems illustrated in FIGS. 1 and 5.

In 902, an AV testing editor, via a user interface, can receive user input. The user input may define a test suite having road scenarios to be simulated by a simulator to evaluate performance of autonomous vehicle software (e.g., the AV stack). The test suite may include first areas on a map corresponding to a first set of road scenarios that lack (pre-existing or valid) road model data. In some cases, the test suite may include second areas on the map corresponding to a second set of road scenarios that have (existing or valid) road model data.

In 904, the AV testing editor may determine (or receive from a user via the user interface), a desired value for a coverage amount for the test suite. The coverage amount may be based on a proportion of road scenarios of the test suite having road model data relative to a total number of road scenarios.

In 906, the AV testing editor, e.g., the optimizer, may identify a set of map sections out of candidate sets of map sections that has a least number of map sections out of the candidate sets of map sections. The optimizer may perform an optimization algorithm as illustrated herein. The candidate sets of map sections can cover at least a portion of the first areas on the map that lack road model data. The candidate sets of map sections may meet the desired value of the coverage amount of the test suite when road model data of a given candidate set of map sections are generated.

In 908, the AV testing editor may transmit a request to a road generator (e.g., map section generator) to generate location-specific road model data within the identified map sections.

In 910, the map consumer, e.g., a simulator, may utilize the generated location-specific road model data to run the test suite.

Exemplary AV Management System

Figure 10:
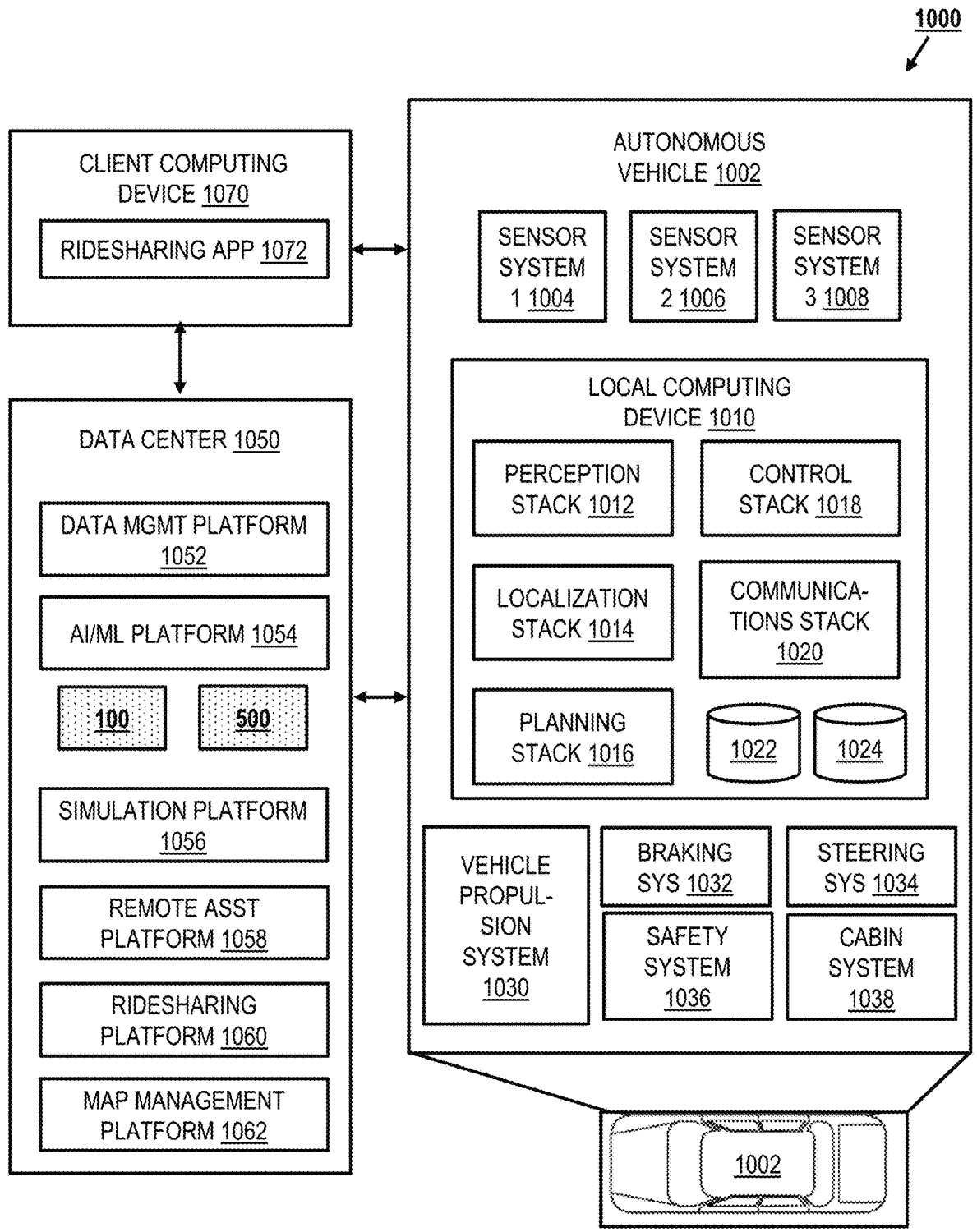
FIG. 10 illustrates an example system environment that may be used to facilitate autonomous vehicles operations, according to some aspects of the disclosed technology.

Turning now to FIG. 10, this figure illustrates an example of an AV management system 1000, in which some of the aspects of the present disclosure can be implemented. One of ordinary skill in the art will understand that, for the AV management system 1000 and any system discussed in the present disclosure, there may be additional or fewer components in similar or alternative configurations. The illustrations and examples provided in the present disclosure are for conciseness and clarity. Other embodiments may include different numbers and/or types of elements, but one of ordinary skill the art will appreciate that such variations do not depart from the scope of the present disclosure.

In this example, the AV management system 1000 includes an AV 1002, a data center 1050, and a client computing device 1070. The AV 1002, the data center 1050, and the client computing device 1070 may communicate with one another over one or more networks (not shown), such as a public network (e.g., the Internet, an Infrastructure as a Service (IaaS) network, a Platform as a Service (PaaS) network, a Software as a Service (SaaS) network, another Cloud Service Provider (CSP) network, etc.), a private network (e.g., a Local Area Network (LAN), a private cloud, a Virtual Private Network (VPN), etc.), and/or a hybrid network (e.g., a multi-cloud or hybrid cloud network, etc.).

AV 1002 may navigate about roadways without a human driver based on sensor signals generated by multiple sensor systems 1004, 1006, and 1008. The sensor systems 1004-1008 may include different types of sensors and may be arranged about the AV 1002. For instance, the sensor systems 1004-1008 may comprise Inertial Measurement Units (IMUs), cameras (e.g., still image cameras, video cameras, etc.), light sensors (e.g., LIDAR systems, ambient light sensors, infrared sensors, etc.), RADAR systems, a Global Navigation Satellite System (GNSS) receiver, (e.g., Global Positioning System (GPS) receivers), audio sensors (e.g., microphones, Sound Navigation and Ranging (SONAR) systems, ultrasonic sensors, etc.), engine sensors, speedometers, tachometers, odometers, altimeters, tilt sensors, impact sensors, airbag sensors, seat occupancy sensors, open/closed door sensors, tire pressure sensors, rain sensors, and so forth. For example, the sensor system 1004 may be a camera system, the sensor system 1006 may be a LIDAR system, and the sensor system 1008 may be a RADAR system. Other embodiments may include any other number and type of sensors.

AV 1002 may also include several mechanical systems that may be used to maneuver or operate AV 1002. For instance, the mechanical systems may include vehicle propulsion system 1030, braking system 1032, steering system 1034, safety system 1036, and cabin system 1038, among other systems. Vehicle propulsion system 1030 may include an electric motor, an internal combustion engine, or both. The braking system 1032 may include an engine brake, a wheel braking system (e.g., a disc braking system that utilizes brake pads), hydraulics, actuators, and/or any other suitable componentry configured to assist in decelerating AV 1002. The steering system 1034 may include suitable componentry configured to control the direction of movement of the AV 1002 during navigation. Safety system 1036 may include lights and signal indicators, a parking brake, airbags, and so forth. The cabin system 1038 may include cabin temperature control systems, in-cabin entertainment systems, and so forth. In some embodiments, the AV 1002 may not include human driver actuators (e.g., steering wheel, handbrake, foot brake pedal, foot accelerator pedal, turn signal lever, window wipers, etc.) for controlling the AV 1002. Instead, the cabin system 1038 may include one or more client interfaces (e.g., GUIs, Voice User Interfaces (VUIs), etc.) for controlling certain aspects of the mechanical systems 1030-1038.

AV 1002 may additionally include a local computing device 1010 that is in communication with the sensor systems 1004-1008, the mechanical systems 1030-1038, the data center 1050, and the client computing device 1070, among other systems. The local computing device 1010 may include one or more processors and memory, including instructions that may be executed by the one or more processors. The instructions may make up one or more software stacks or components responsible for controlling the AV 1002; communicating with the data center 1050, the client computing device 1070, and other systems; receiving inputs from riders, passengers, and other entities within the AV's environment; logging metrics collected by the sensor systems 1004-1008; and so forth. In this example, the local computing device 1010 includes a perception stack 1012, a mapping and localization stack 1014, a planning stack 1016, a control stack 1018, a communications stack 1020, an HD geospatial database 1022, and an AV operational database 1024, among other stacks and systems.

Perception stack 1012 may enable the AV 1002 to "see" (e.g., via cameras, LIDAR sensors, infrared sensors, etc.), "hear" (e.g., via microphones, ultrasonic sensors, RADAR, etc.), and "feel" (e.g., pressure sensors, force sensors, impact sensors, etc.) its environment using information from the sensor systems 1004-1008, the mapping and localization stack 1014, the HD geospatial database 1022, other components of the AV, and other data sources (e.g., the data center 1050, the client computing device 1070, third-party data sources, etc.). The perception stack 1012 may detect and classify objects and determine their current and predicted locations, speeds, directions, and the like. In addition, the perception stack 1012 may determine the free space around the AV 1002 (e.g., to maintain a safe distance from other objects, change lanes, park the AV, etc.). The perception stack 1012 may also identify environmental uncertainties, such as where to look for moving objects, flag areas that may be obscured or blocked from view, and so forth.

Mapping and localization stack 1014 may determine the AV's position and orientation (pose) using different methods from multiple systems (e.g., GPS, IMUs, cameras, LIDAR, RADAR, ultrasonic sensors, the HD geospatial database 1022, etc.). For example, in some embodiments, the AV 1002 may compare sensor data captured in real-time by the sensor systems 1004-1008 to data in the HD geospatial database 1022 to determine its precise (e.g., accurate to the order of a few centimeters or less) position and orientation. The AV 1002 may focus its search based on sensor data from one or more first sensor systems (e.g., GPS) by matching sensor data from one or more second sensor systems (e.g., LIDAR). If the mapping and localization information from one system is unavailable, the AV 1002 may use mapping and localization information from a redundant system and/or from remote data sources.

The planning stack 1016 may determine how to maneuver or operate the AV 1002 safely and efficiently in its environment. For example, the planning stack 1016 may receive the location, speed, and direction of the AV 1002, geospatial data, data regarding objects sharing the road with the AV 1002 (e.g., pedestrians, bicycles, vehicles, ambulances, buses, cable cars, trains, traffic lights, lanes, road markings, etc.) or certain events occurring during a trip (e.g., an Emergency Vehicle (EMV) blaring a siren, intersections, occluded areas, street closures for construction or street repairs, Double-Parked Vehicles (DPVs), etc.), traffic rules and other safety standards or practices for the road, user input, and other relevant data for directing the AV 1002 from one point to another. The planning stack 1016 may determine multiple sets of one or more mechanical operations that the AV 1002 may perform (e.g., go straight at a specified speed or rate of acceleration, including maintaining the same speed or decelerating; turn on the left blinker, decelerate if the AV is above a threshold range for turning, and turn left; turn on the right blinker, accelerate if the AV is stopped or below the threshold range for turning, and turn right; decelerate until completely stopped and reverse; etc.), and select the best one to meet changing road conditions and events. If something unexpected happens, the planning stack 1016 may select from multiple backup plans to carry out. For example, while preparing to change lanes to turn right at an intersection, another vehicle may aggressively cut into the destination lane, making the lane change unsafe. The planning stack 1016 could have already determined an alternative plan for such an event, and upon its occurrence, help to direct the AV 1002 to go around the block instead of blocking a current lane while waiting for an opening to change lanes.

The control stack 1018 may manage the operation of the vehicle propulsion system 1030, the braking system 1032, the steering system 1034, the safety system 1036, and the cabin system 1038. The control stack 1018 may receive sensor signals from the sensor systems 1004-1008 as well as communicate with other stacks or components of the local computing device 1010 or a remote system (e.g., the data center 1050) to effectuate operation of the AV 1002. For example, the control stack 1018 may implement the final path or actions from the multiple paths or actions provided by the planning stack 1016. Implementation may involve turning the routes and decisions from the planning stack 1016 into commands for the actuators that control the AV's steering, throttle, brake, and drive unit.

The communication stack 1020 may transmit and receive signals between the various stacks and other components of the AV 1002 and between the AV 1002, the data center 1050, the client computing device 1070, and other remote systems.

The communication stack 1020 may enable the local computing device 1010 to exchange information remotely over a network, such as through an antenna array or interface that may provide a metropolitan WIFI® network connection, a mobile or cellular network connection (e.g., Third Generation (3G), Fourth Generation (4G), Long-Term Evolution (LTE), 5th Generation (5G), etc.), and/or other wireless network connection (e.g., License Assisted Access (LAA), Citizens Broadband Radio Service (CBRS), MULTEFIRE, etc.). The communication stack 1020 may also facilitate local exchange of information, such as through a wired connection (e.g., a user's mobile computing device docked in an in-car docking station or connected via Universal Serial Bus (USB), etc.) or a local wireless connection (e.g., Wireless Local Area Network (WLAN), BLUETOOTH®, infrared, etc.).

The HD geospatial database 1022 may store HD maps and related data of the streets upon which the AV 1002 travels. In some embodiments, the HD maps and related data may comprise multiple layers, such as an areas layer, a lanes and boundaries layer, an intersections layer, a traffic controls layer, and so forth. The areas layer may include geospatial information indicating geographic areas that are drivable (e.g., roads, parking areas, shoulders, etc.) or not drivable (e.g., medians, sidewalks, buildings, etc.), drivable areas that constitute links or connections (e.g., drivable areas that form the same road) versus intersections (e.g., drivable areas where two or more roads intersect), and so on. The lanes and boundaries layer may include geospatial information of road lanes (e.g., lane or road centerline, lane boundaries, type of lane boundaries, etc.) and related attributes (e.g., direction of travel, speed limit, lane type, etc.). The lanes and boundaries layer may also include 3D attributes related to lanes (e.g., slope, elevation, curvature, etc.). The intersections layer may include geospatial information of intersections (e.g., crosswalks, stop lines, turning lane centerlines, and/or boundaries, etc.) and related attributes (e.g., permissive, protected/permissive, or protected only left-turn lanes; permissive, protected/permissive, or protected only U-turn lanes; permissive or protected only right-turn lanes; etc.). The traffic controls layer may include geospatial information of traffic signal lights, traffic signs, and other road objects and related attributes.

The AV operational database 1024 may store raw AV data generated by the sensor systems 1004-1008 and other components of the AV 1002 and/or data received by the AV 1002 from remote systems (e.g., the data center 1050, the client computing device 1070, etc.). In some embodiments, the raw AV data may include HD LIDAR point cloud data, image or video data, RADAR data, GPS data, and other sensor data that the data center 1050 may use for creating or updating AV geospatial data as discussed further below with respect to FIG. 5 and elsewhere in the present disclosure.

The data center 1050 may be a private cloud (e.g., an enterprise network, a co-location provider network, etc.), a public cloud (e.g., an IaaS network, a PaaS network, a SaaS network, or other CSP network), a hybrid cloud, a multi-cloud, and so forth. The data center 1050 may include one or more computing devices remote to the local computing device 1010 for managing a fleet of AVs and AV-related services. For example, in addition to managing the AV 1002, the data center 1050 may also support a ridesharing service, a delivery service, a remote/roadside assistance service, street services (e.g., street mapping, street patrol, street cleaning, street metering, parking reservation, etc.), and the like.

The data center 1050 may send and receive various signals to and from the AV 1002 and the client computing device 1070. These signals may include sensor data captured by the sensor systems 1004-1008, roadside assistance requests, software updates, ridesharing pick-up and drop-off instructions, and so forth. In this example, the data center 1050 includes one or more of a data management platform 1052, an artificial intelligence/machine learning (AI/ML) platform 1054, a simulation platform 1056, a remote assistance platform 1058, a ridesharing platform 1060, and a map management platform 1062, among other systems.

Data management platform 1052 may be a "big data" system capable of receiving and transmitting data at high speeds (e.g., near real-time or real-time), processing a large variety of data, and storing large volumes of data (e.g., terabytes, petabytes, or more of data). The varieties of data may include data having different structures (e.g., structured, semi-structured, unstructured, etc.), data of different types (e.g., sensor data, mechanical system data, ridesharing service data, map data, audio data, video data, etc.), data associated with different types of data stores (e.g., relational databases, key-value stores, document databases, graph databases, column-family databases, data analytic stores, search engine databases, time series databases, object stores, file systems, etc.), data originating from different sources (e.g., AVs, enterprise systems, social networks, etc.), data having different rates of change (e.g., batch, streaming, etc.), or data having other heterogeneous characteristics. The various platforms and systems of the data center 1050 may access data stored by the data management platform 1052 to provide their respective services.

The AI/ML platform 1054 may provide the infrastructure for training and evaluating machine learning algorithms for operating the AV 1002, the simulation platform 1056, the remote assistance platform 1058, the ridesharing platform 1060, the map management platform 1062, and other platforms and systems. Using the AI/ML platform 1054, data scientists may prepare data sets from the data management platform 1052; select, design, and train machine learning models; evaluate, refine, and deploy the models; maintain, monitor, and retrain the models; and so on.

System 100 of FIG. 1 and/or system 500 of FIG. 5 may be implemented in data center 1050.

The remote assistance platform 1058 may generate and transmit instructions regarding the operation of the AV 1002. For example, in response to an output of the AI/ML platform 1054 or other system of the data center 1050, the remote assistance platform 1058 may prepare instructions for one or more stacks or other components of the AV 1002.

The ridesharing platform 1060 may interact with a customer of a ridesharing service via a ridesharing application 1072 executing on the client computing device 1070. The client computing device 1070 may be any type of computing system, including a server, desktop computer, laptop, tablet, smartphone, smart wearable device (e.g., smart watch; smart eyeglasses or other Head-Mounted Display (HMD); smart ear pods or other smart in-ear, on-ear, or over-ear device; etc.), gaming system, or other general-purpose computing device for accessing the ridesharing application 1072. The client computing device 1070 may be a customer's mobile computing device or a computing device integrated with the AV 1002 (e.g., the local computing device 1010). The ridesharing platform 1060 may receive requests to be picked up or dropped off from the ridesharing application 1072 and dispatch the AV 1002 for the trip.

Map management platform 1062 may provide a set of tools for the manipulation and management of geographic and spatial (geospatial) and related attribute data. The data management platform 1052 may receive LIDAR point cloud data, image data (e.g., still image, video, etc.), RADAR data, GPS data, and other sensor data (e.g., raw data) from one or more AVs 1002, Unmanned Aerial Vehicles (UAVs), satellites, third-party mapping services, and other sources of geospatially referenced data. The raw data may be processed, and map management platform 1062 may render base representations (e.g., tiles (2D), bounding volumes (3D), etc.) of the AV geospatial data to enable users to view, query, label, edit, and otherwise interact with the data. Map management platform 1062 may manage workflows and tasks for operating on the AV geospatial data. Map management platform 1062 may control access to the AV geospatial data, including granting or limiting access to the AV geospatial data based on user-based, role-based, group-based, task-based, and other attribute-based access control mechanisms. Map management platform 1062 may provide version control for the AV geospatial data, such as to track specific changes that (human or machine) map editors have made to the data and to revert changes when necessary. Map management platform 1062 may administer release management of the AV geospatial data, including distributing suitable iterations of the data to different users, computing devices, AVs, and other consumers of HD maps. Map management platform 1062 may provide analytics regarding the AV geospatial data and related data, such as to generate insights relating to the throughput and quality of mapping tasks.

In some embodiments, the map viewing services of map management platform 1062 may be modularized and deployed as part of one or more of the platforms and systems of the data center 1050. For example, the AI/ML platform 1054 may incorporate the map viewing services for visualizing the effectiveness of various object detection or object classification models, the simulation platform 1056 may incorporate the map viewing services for recreating and visualizing certain driving scenarios, the remote assistance platform 1058 may incorporate the map viewing services for replaying traffic incidents to facilitate and coordinate aid, the ridesharing platform 1060 may incorporate the map viewing services into the client application 1072 to enable passengers to view the AV 1002 in transit enroute to a pick-up or drop-off location, and so on.

Exemplary Processor-Based System

Figure 11:
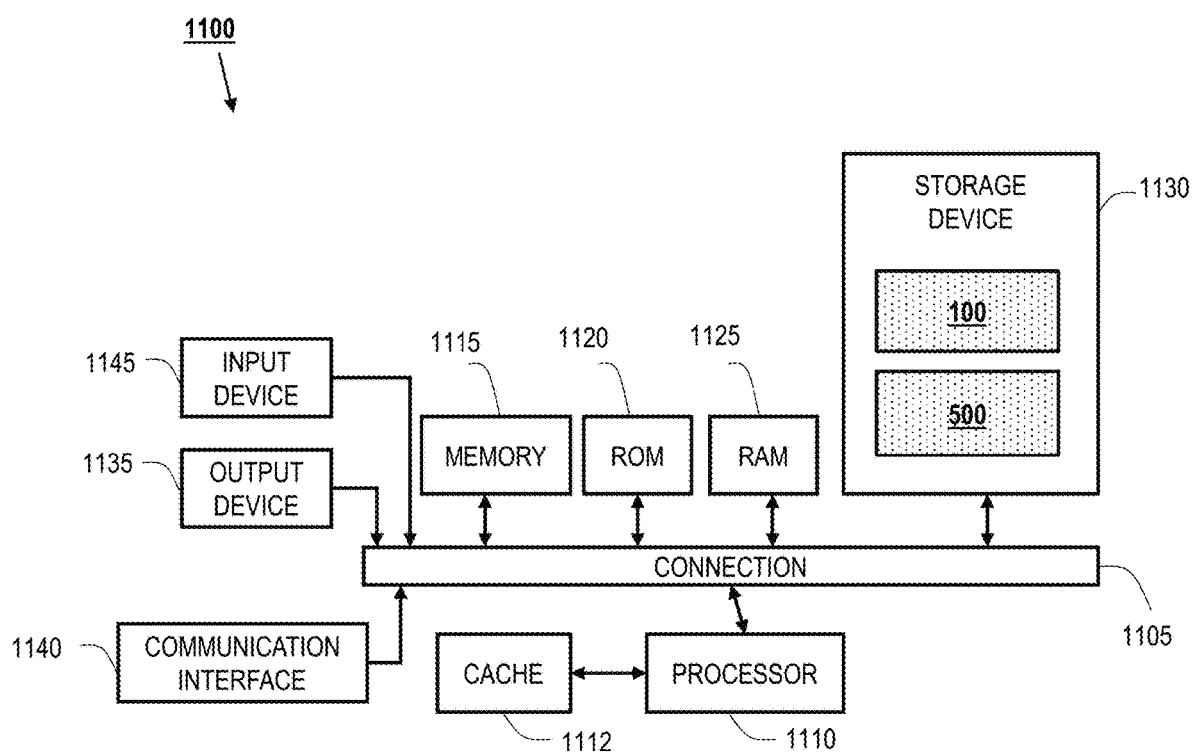
FIG. 11 illustrates an example processor-based system with which some aspects of the subject technology may be implemented.

FIG. 11 illustrates an example processor-based system with which some aspects of the subject technology may be implemented. For example, processor-based system 1100 may be any computing device making up, or any component thereof in which the components of the system are in communication with each other using connection 1105. Connection 1105 may be a physical connection via a bus, or a direct connection into processor 1110, such as in a chipset architecture. Connection 1105 may also be a virtual connection, networked connection, or logical connection.

In some embodiments, computing system 1100 is a distributed system in which the functions described in this disclosure may be distributed within a datacenter, multiple data centers, a peer network, etc. In some embodiments, one or more of the described system components represents many such components each performing some or all of the function for which the component is described. In some embodiments, the components may be physical or virtual devices.

Example system 1100 includes at least one processing unit (CPU, GPU, or a different kind of hardware processor) 1110 and connection 1105 that couples various system components including system memory 1115, such as Read-Only Memory (ROM) 1120 and Random-Access Memory (RAM) 1125 to processor 1110. Computing system 1100 may include a cache of high-speed memory 1112 connected directly with, in close proximity to, or integrated as part of processor 1110.

Processor 1110 may include any general-purpose processor and a hardware service or software service, implementing functionalities carried out by components of system 100 and/or components of system 500. Processor 1110 may essentially be a completely self-contained computing system, containing multiple cores or processors, a bus, memory controller, cache, etc. A multi-core processor may be symmetric or asymmetric.

To enable user interaction, computing system 1100 includes an input device 1145, which may represent any number of input mechanisms, such as a microphone for speech, a touch-sensitive screen for gesture or graphical input, keyboard, mouse, motion input, speech, etc. Computing system 1100 may also include output device 1135, which may be one or more of a number of output mechanisms known to those of skill in the art. In some instances, multimodal systems may enable a user to provide multiple types of input/output to communicate with computing system 1100. Computing system 1100 may include communications interface 1140, which may generally govern and manage the user input and system output. The communication interface may perform or facilitate receipt and/or transmission of wired or wireless communications via wired and/or wireless transceivers.

Communication interface 1140 may also include one or more GNSS receivers or transceivers that are used to determine a location of the computing system 1100 based on receipt of one or more signals from one or more satellites associated with one or more GNSS systems. GNSS systems include, but are not limited to, the US-based GPS, the Russia-based Global Navigation Satellite System (GLONASS), the China-based BeiDou Navigation Satellite System (BDS), and the Europe-based Galileo GNSS. There is no restriction on operating on any particular hardware arrangement, and therefore the basic features here may easily be substituted for improved hardware or firmware arrangements as they are developed.

Storage device 1130 may be a non-volatile and/or non-transitory and/or computer-readable memory device and may be a hard disk or other types of computer-readable media which may store data that are accessible by a computer.

Storage device 1130 may include software services, servers, services, etc., that when the code that defines such software is executed by the processor 1110, it causes the system 1100 to perform a function. In some embodiments, a hardware service that performs a particular function may include the software component stored in a computer-readable medium in connection with the necessary hardware components, such as processor 1110, connection 1105, output device 1135, etc., to carry out the function.

Embodiments within the scope of the present disclosure may also include tangible and/or non-transitory computer-readable storage media or devices for carrying or having computer-executable instructions or data structures stored thereon. Such tangible computer-readable storage devices may be any available device that may be accessed by a general-purpose or special-purpose computer, including the functional design of any special-purpose processor as described above. By way of example, and not limitation, such tangible computer-readable devices may include RAM, ROM, EEPROM, CD-ROM or other optical disk storage, magnetic disk storage or other magnetic storage devices, or any other device which may be used to carry or store desired program code in the form of computer-executable instructions, data structures, or processor chip design. When information or instructions are provided via a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable storage devices.

Computer-executable instructions include, for example, instructions and data which cause a general-purpose computer, special-purpose computer, or special-purpose processing device to perform a certain function or group of functions. Computer-executable instructions also include program modules that are executed by computers in stand-alone or network environments. Generally, program modules include routines, programs, components, data structures, objects, and the functions inherent in the design of special-purpose processors, etc. that perform tasks or implement abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Other embodiments of the disclosure may be practiced in network computing environments with many types of computer system configurations, including personal computers, hand-held devices, multi-processor systems, microprocessor-based or programmable consumer electronics, network personal computers (PCs), minicomputers, mainframe computers, and the like. Embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

The various embodiments described above are provided by way of illustration only and should not be construed to limit the scope of the disclosure. For example, the principles herein apply equally to optimization as well as general improvements. Various modifications and changes may be made to the principles described herein without following the example embodiments and applications illustrated and described herein, and without departing from the spirit and scope of the disclosure. Claim language reciting "at least one of" a set indicates that one member of the set or multiple members of the set satisfy the claim.

SELECT EXAMPLES

Example 1 is a computer-implemented method for optimizing computing resources used in generating map sections for autonomous vehicle evaluation, the method comprising: receiving user input, wherein the user input defines a test suite having road scenarios to be simulated by a simulator to evaluate performance of autonomous vehicle software, wherein the test suite comprises first areas on a map corresponding to a first set of road scenarios that lack road model data; determining a desired value for a coverage amount for the test suite, wherein the coverage amount is based on a proportion of road scenarios of the test suite having road model data relative to a total number of road scenarios; identifying a set of map sections out of candidate sets of map sections that has a least number of map sections out of the candidate sets of map sections, wherein: (1) the candidate sets of map sections cover at least a portion of the first areas on the map that lack road model data, and (2) the candidate sets of map sections meet the desired value of the coverage amount of the test suite when road model data of a given candidate set of map sections are generated; transmitting a request to a road generator to generate location-specific road model data within the identified map sections; and utilizing the generated location-specific road model data by the simulator to run the test suite.

In Example 2, the computer-implemented method of Example 1 can optionally include the desired value for the coverage amount is a percentage.

In Example 3, the computer-implemented method of Example 1 or 2 can optionally include the desired value of the coverage amount being a percentage of areas (or scenarios in the test suite) on the map meeting one or more conditions or requirements.

In Example 4, the computer-implemented method of any one of Examples 1-3 can optionally include: determining the areas on the map expected to be traversed by an autonomous vehicle in the test suite; and determining whether a given area lacks (pre-existing) road model data.

In Example 5, the computer-implemented method of any one of Examples 1-4 can optionally include: the test suite further including second areas on the map that have (pre-existing) road model data specific to the second areas.

In Example 6, the computer-implemented method of Example 5 can optionally include: determining a present coverage amount of the test suite based on the second areas and a total area of first and second areas; and outputting the present coverage amount to a user via user interface.

In Example 7, the computer-implemented method of Example 6 can optionally include: outputting, to a user via a user interface, the least number of map sections that can increase the present coverage amount to achieve the desired coverage amount.

In Example 8, the computer-implemented method of Example 6 or 7 can optionally include, further comprising: determining a least number of map sections and locations of map sections that can increase the present coverage amount to achieve the desired coverage amount.

In Example 9, the computer-implemented method of any one of Examples 1-8 can optionally include: outputting, to a user via a user interface, the least number of map sections to be generated to achieve the desired coverage amount.

In Example 10, the computer-implemented method of any one of Examples 1-9 can optionally include: determining a least number of map sections and locations of map sections to be generated to achieve the desired coverage amount.

In Example 11, the computer-implemented method of any one of Examples 1-10 can optionally include: receiving dimensions of the map sections.

In Example 12, the computer-implemented method of any one of Examples 1-11 can optionally include: receiving indication that dimensions of the map sections are variable.

In Example 13, the computer-implemented method of any one of Examples 1-12 can optionally include: receiving indication the map sections can overlap each other.

In Example 14, the computer-implemented method of any one of Examples 1-13 can optionally include: receiving indication the map sections cannot overlap each other.

In Example 15, the computer-implemented method of any one of Examples 1-14 can optionally include: receiving a padding value specifying a distance between a border of an area and an edge of (pre-existing) road model data, wherein the padding value to be used for determining whether the area has (pre-existing) road model data.

In Example 16, the computer-implemented method of any one of Examples 1-15 can optionally include: each map section being defined by an identifier and a bounding box.

In Example 17, the computer-implemented method of any one of Examples 1-16 can optionally include: each map section being defined by an identifier, a bounding box, and a timestamp.

In Example 18, the computer-implemented method of any one of Examples 1-17 can optionally include: each map section being defined by an identifier, a bounding box, and a source data set identifier.

In Example 19, the computer-implemented method of any one of Examples 1-18 can optionally include the road model data comprising: for x, y position within an area, provide one or more of: height, normal, and location-specific road surface parameter(s).

In Example 20, the computer-implemented method of Example 19 can optionally include the location-specific road parameter(s) including one or more of: material type, roughness, and friction coefficient.

In Example 21, the computer-implemented method of any one of Examples 1-20 can optionally include road model data being generated by the road generator by: generating a triangle mesh representation of road surface of a given map section based on sensor data, and semantic map tile data; receiving one or more road surface parameter corresponding to the road surface; and generating the road model data based on the triangular mesh representation and the one or more road surface parameter.

In Example 22, the computer-implemented method of any one of Examples 1-21 can optionally include determining the least number of map sections comprising: performing a greedy search algorithm to determine the least number of map sections.

In Example 23, the computer-implemented method of any one of Examples 1-22 can optionally include determining the least number of map sections comprising: performing evolutionary search algorithm to determine the least number of map sections.

In Example 24, the computer-implemented method of any one of Examples 1-23 can optionally include determining the least number of map sections comprising: performing a stochastic search algorithm to determine the least number of map sections.

In Example 25, the computer-implemented method of any one of Examples 1-24 can optionally include: the map being divided into a grid of non-overlapping bounding boxes; and identifying the set of map sections comprising selecting a least number of non-overlapping bounding boxes as map sections that achieve the desired value of the coverage amount of the test suite.

In Example 26, the computer-implemented method of any one of Examples 1-25 can optionally include identifying the set of map sections including: generating the candidate sets of map sections; and selecting a set of map sections from the candidate sets of map sections that has a least number of map sections and that minimizes a number of road scenarios that are not covered by the candidate sets of map sections.

In Example 27, the computer-implemented method of any one of Examples 1-26 can optionally include the user input further comprising one or more of the following: dimensions of the map sections; an indication that dimensions of the map sections are variable; an indication the map sections can overlap each other; an indication the map sections cannot overlap each other; and a padding value specifying a distance between a border of an area and an edge of road model data, wherein the padding value to be used for determining whether the area has road model data.

Example 28 is a computer-implemented system, comprising: one or more processing units; and one or more non-transitory computer-readable media storing instructions, when executed by the one or more processing units, cause the one or more processing units to perform operations to: receive user input, wherein the user input defines a test suite comprising road scenarios to be simulated by a simulator to evaluate performance of autonomous vehicle software; determine bounding boxes capturing paths expected to be traversed by a simulated autonomous vehicle in the road scenarios of the test suite; determine that a subset of the bounding boxes lack road model data; receive further user input, wherein the further user input includes a desired value of the coverage amount for the test suite, wherein the coverage amount is based on a proportion of road scenarios of the test suite having road model data relative to a total number of road scenarios; identify a set of map sections that has a least number of map sections out of candidate sets of map sections, and that meets the desired value of the coverage amount of the test suite when road model data within the identified set of map sections are generated; and transmit a request to a road generator to generate location-specific road model data within the identified set of map sections, wherein the location-specific road model data is usable by the simulator for autonomous vehicle software evaluation.

In Example 29, the computer-implemented system of Example 28 can optionally include: the desired value of the coverage amount being a percentage of scenarios of the test suite having road model data relative to a total number of scenarios of the test suite.

Example 30 is a computer-implemented system, comprising: one or more processing units; and one or more non-transitory computer-readable media storing instructions, when executed by the one or more processing units, cause the one or more processing units to perform any one of the methods of Examples 1-27.

Example 31 includes one or more non-transitory computer-readable media storing instructions, when executed by one or more processing units, cause the one or more processing units to perform operations to: receive a test suite specified by a user via a graphical user interface, comprising first areas on a map that lack road model data, and second areas on the map that has road model data; accentuate the first areas on the graphical user interface; receive a desired value of a coverage amount for the test suite by the user via the graphical user interface, wherein the coverage amount is based on a proportion of the second areas of the test suite relative to a total area of the first and second areas of the test suite; identify a set of map sections out of candidate sets of map sections that has a least number of map sections out of the candidate sets of map sections, wherein the candidate sets of map sections cover at least a portion of the first areas, and the candidate sets of map sections meet the desired value of the coverage amount when road model data within a given candidate set of map sections are generated; output the least number of map sections to the user via the graphical user interface; and transmit a request to a road generator to generate road model data within the identified set of map sections, wherein the location-specific road model data is usable for autonomous vehicle evaluation.

In Example 32, the one or more non-transitory computer-readable media of Example 31 can optionally include to identify the set of map sections out of candidate sets of map sections comprising minimizing an objective function that measures a number of first areas which are not covered by a given candidate set of map sections.

In Example 33, the one or more non-transitory computer-readable media of Example 31 or 32 can optionally include the instructions causing the one or more processing units to further: output, to a user via the graphical user interface, locations of the identified set of map sections to achieve the desired value of the coverage amount.

In Example 34, the one or more non-transitory computer-readable media of any one of Examples 31-33 can optionally include the instructions causing the one or more processing units to further: determine a present value of the coverage amount of the test suite; and output the present coverage amount to a user via the graphical user interface.

In Example 35, the one or more non-transitory computer-readable media of any one of Examples 31-34 can optionally include the instructions causing the one or more processing units to further perform any one of the methods of Examples 1-27.

Example 36 is an apparatus comprising means for performing or carrying out any one of the methods of Examples 1-27.

The invention claimed is:

1. A computer-implemented method for optimizing computing resources used in generating map sections for autonomous vehicle evaluation, the method comprising:
  receiving user input;
  defining a test suite based on the user input, the test suite having road scenarios to be simulated by a simulator to evaluate performance of autonomous vehicle software, wherein the road scenarios define a map, the road scenarios including a first subset of road scenarios corresponding to first areas on the map that lack road model data and a second subset of road scenarios corresponding to second areas on the map that have road model data;
  determining a desired value for a coverage amount for the map, wherein the coverage amount is a proportion of second areas of the map to a total area of the map;
  identifying a minimal set of map sections for which:
    the minimal set of map sections covers at least a portion of the first areas, and
    the minimal set of map sections meets the desired value of the coverage amount when road model data is generated for the first areas;
  transmitting a request to a road generator to generate location-specific road model data within the minimal set of map sections; and
  training the autonomous vehicle at a simulator utilizing the test suite having the generated location-specific road model data.

2. The computer-implemented method of claim 1, wherein generating road model data for the first areas creates second areas and thereby changes the coverage amount.

3. The computer-implemented method of claim 1, wherein the desired value for the coverage amount comprises a percentage of areas on the map meeting one or more conditions or requirements.

4. The computer-implemented method of claim 1, wherein the first areas on the map corresponding to the first set of road scenarios that lack road model data are identified by:
  determining areas on the map expected to be traversed by an autonomous vehicle in the test suite; and
  determining whether a given area lacks road model data.

5. The computer-implemented method of claim 1, wherein:
  the test suite further includes second areas on the map corresponding to a second set of road scenarios that have road model data.

6. The computer-implemented method of claim 1, wherein identifying the set of map sections include:
  generating the candidate sets of map sections; and
  selecting a set of map sections from the candidate sets of map sections that has a least number of map sections and that minimizes a number of road scenarios that are not covered by the candidate sets of map sections.

7. The computer-implemented method of claim 1, wherein the user input further comprises one or more of the following:
  dimensions of the map sections;
  an indication that dimensions of the map sections are variable;
  an indication the map sections can overlap each other;
  an indication the map sections cannot overlap each other; and
  a padding value specifying a distance between a border of an area and an edge of road model data, wherein the padding value to be used for determining whether the area has road model data.

8. The computer-implemented method of claim 1, wherein each map section is defined by an identifier and a bounding box.

9. The computer-implemented method of claim 1, wherein each map section is defined by an identifier, a bounding box, and a timestamp.

10. The computer-implemented method of claim 1, wherein each map section is defined by an identifier, a bounding box, and a source data set identifier.

11. The computer-implemented method of claim 1, wherein the road model data comprises:
  for x, y position within an area, provide one or more of: height, normal, and location-specific road surface parameter(s).

12. The computer-implemented method of claim 11, wherein the location-specific road surface parameter(s) include one or more of: material type, roughness, and friction coefficient.

13. The computer-implemented method of claim 1, wherein road model data is generated by the road generator by:
  generating a triangle mesh representation of road surface of a given map section based on sensor data, and semantic map tile data;
  receiving one or more road surface parameter corresponding to the road surface; and
  generating the road model data based on the triangular mesh representation and the one or more road surface parameter.

14. The computer-implemented method of claim 1, wherein:
  the map is divided into a grid of non-overlapping bounding boxes; and
  identifying the set of map sections comprises selecting a least number of non-overlapping bounding boxes as map sections that achieve the desired value of the coverage amount of the test suite.

15. A computer-implemented system, comprising:
one or more processing units; and
one or more non-transitory computer-readable media storing instructions, when executed by the one or more processing units, cause the one or more processing units to perform operations to:
receive user input;
define a test suite based on the user input, the test suite comprising road scenarios to be simulated by a simulator to evaluate performance of autonomous vehicle software, wherein the road scenarios define a map, the road scenarios including a first subset of road scenarios corresponding to first areas on the map that lack road model data and a second subset of road scenarios corresponding to second areas on the map that have road model data;
determine bounding boxes capturing paths expected to be traversed by a simulated autonomous vehicle in the road scenarios of the map;
determine that a subset of the bounding boxes lack road model data;
receive further user input, wherein the further user input includes a desired value of a coverage amount for the map, wherein the coverage amount is based on a proportion of road scenarios of the test suite having road model data relative to a total number of road scenarios;
identify a minimal set of map sections that meets the desired value of the coverage amount of the test suite when road model data is generated for the test suite; and
transmit a request to a road generator to generate location-specific road model data within the minimal set of map sections, wherein the location-specific road model data is usable by the simulator for to train the autonomous vehicle.

16. The computer-implemented system of claim 15, wherein the desired value of the coverage amount is a percentage of scenarios of the test suite having road model data relative to a total number of scenarios of the test suite.

17. One or more non-transitory computer-readable media storing instructions, when executed by one or more processing units, cause the one or more processing units to perform operations to:

receive a test suite specified by a user via a graphical user interface, comprising first areas on a map that lack road model data, and second areas on the map that has road model data;
accentuate the first areas on the graphical user interface;
receive a desired value of a coverage amount for the map from the user via the graphical user interface, wherein the coverage amount is based on a proportion of the second areas of the map relative to a total area of the first and second areas of the map;
identify a minimal set of map sections, wherein the minimal set of map sections covers at least a portion of the first areas, and the minimal set of map sections meets the desired value of the coverage amount when road model data within the minimal set of map sections is generated;
output the minimal set of map sections to the user via the graphical user interface; and
transmit a request to a road generator to generate road model data within the identified set of map sections, wherein the location-specific road model data is usable for training an autonomous vehicle.

18. The one or more non-transitory computer-readable media of claim 17, wherein to identify the set of map sections out of candidate sets of map sections comprises minimizing an objective function that measures a number of first areas which are not covered by a given candidate set of map sections.

19. The one or more non-transitory computer-readable media of claim 17, wherein the instructions cause the one or more processing units to further:
output, to a user via the graphical user interface, locations of the identified set of map sections to achieve the desired value of the coverage amount.

20. The one or more non-transitory computer-readable media of claim 17, wherein the instructions cause the one or more processing units to further:
determine a present value of the coverage amount of the test suite; and
output the present coverage amount to a user via the graphical user interface.

* * * * *